US010071786B2

(12) United States Patent
Droux

(10) Patent No.: US 10,071,786 B2
(45) Date of Patent: Sep. 11, 2018

(54) TWO-WHEELED VEHICLE WITH REAR-WHEEL SUSPENSION

(71) Applicant: Flow AG, Lengnau BE (CH)

(72) Inventor: Vincenz Droux, Lengnau (CH)

(73) Assignee: FLOW AG, Lengnau BE (CH)

( * ) Notice: Subject to any disclaimer, the term of this patent is extended or adjusted under 35 U.S.C. 154(b) by 201 days.

(21) Appl. No.: 15/028,346

(22) PCT Filed: Sep. 15, 2014

(86) PCT No.: PCT/CH2014/000132
§ 371 (c)(1),
(2) Date: Apr. 8, 2016

(87) PCT Pub. No.: WO2015/051472
PCT Pub. Date: Apr. 16, 2015

(65) Prior Publication Data
US 2016/0257371 A1    Sep. 8, 2016

(30) Foreign Application Priority Data
Oct. 11, 2013  (CH) ...................................... 1741/13

(51) Int. Cl.
*B62K 25/28*    (2006.01)
*B62K 3/02*    (2006.01)
*B62K 25/04*    (2006.01)

(52) U.S. Cl.
CPC ................ *B62K 25/28* (2013.01); *B62K 3/02* (2013.01); *B62K 25/286* (2013.01); *B62K 2025/048* (2013.01)

(58) Field of Classification Search
CPC ........ B62K 25/28; B62K 25/286; B62K 3/02; B62K 2025/048
(Continued)

(56) References Cited

U.S. PATENT DOCUMENTS 450,705 A * 4/1891 Surbridge .............. B62K 25/28
280/284
5,409,248 A   4/1995 Williams
(Continued)

FOREIGN PATENT DOCUMENTS

EP    0 538 949 A1    4/1993
EP    1 060 979 A2    12/2000
(Continued)

OTHER PUBLICATIONS

Office Action dated Dec. 20, 2017 issued in the corresponding Taiwanese Application No. 103135179 wtih an English Translation.

*Primary Examiner* — Anne Marie M Boehler
(74) *Attorney, Agent, or Firm* — Birch, Stewart, Kolasch & Birch, LLP

(57) ABSTRACT

The invention relates to a two-wheeled vehicle with rear-wheel suspension, comprising a frame (602) with at least one frame tube (603, 604, 605), a swingarm assembly (620) mounted on the frame (602) for the purpose of suspending a rear wheel (613), a linear spring/damper element, and a transmission mechanism (630) that is functionally connected to both the spring/damper element and to the swingarm assembly (620). The spring/damper element is received in a receiving chamber inside the frame tube (603). The transmission mechanism (630) is designed and mounted on the frame (602) such that it transmits a force between the spring/damper element and the swingarm assembly (620) by means of a rotational axis that extends through an axial opening in the frame tube (603). Arranging the spring/damper element inside the frame (602) avoids soiling. The rotational axis of the transmission mechanism (630) can also be designed to have relatively small dimensions in order to achieve a high degree of frame stability. In addition, the rotational axis can be arranged at different points in the frame and the spring/damper element can be housed in (Continued)

different regions of the frame in order for the transmission mechanism to be combinable with conventional rear-wheel suspension systems.

14 Claims, 16 Drawing Sheets

(58) Field of Classification Search
USPC .............................................. 280/284, 288.3
See application file for complete search history.

(56) References Cited

U.S. PATENT DOCUMENTS

| | | |
|---|---|---|
| 5,435,584 A | 7/1995 | Buell |
| 5,772,228 A | 6/1998 | Owyang |
| 7,104,562 B2 | 9/2006 | Schmider et al. |
| 9,650,103 B2 * | 5/2017 | Perkins ................ B62K 25/286 |
| 2004/0188978 A1 | 9/2004 | Schmider et al. |
| 2010/0213685 A1 * | 8/2010 | Waxham ................ B62K 25/04 |
| | | 280/284 |

FOREIGN PATENT DOCUMENTS

| | | |
|---|---|---|
| FR | 2 765 854 A1 | 1/1999 |
| TW | M417317 U | 12/2011 |

* cited by examiner

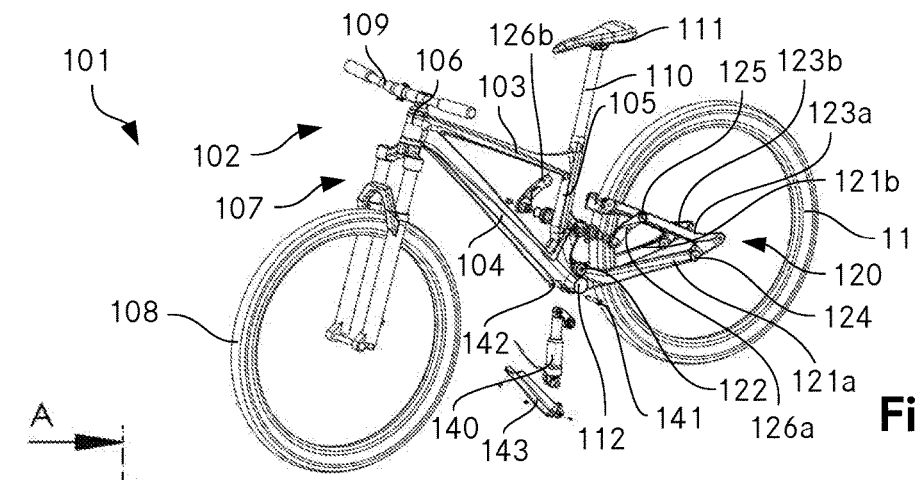
Fig. 2A
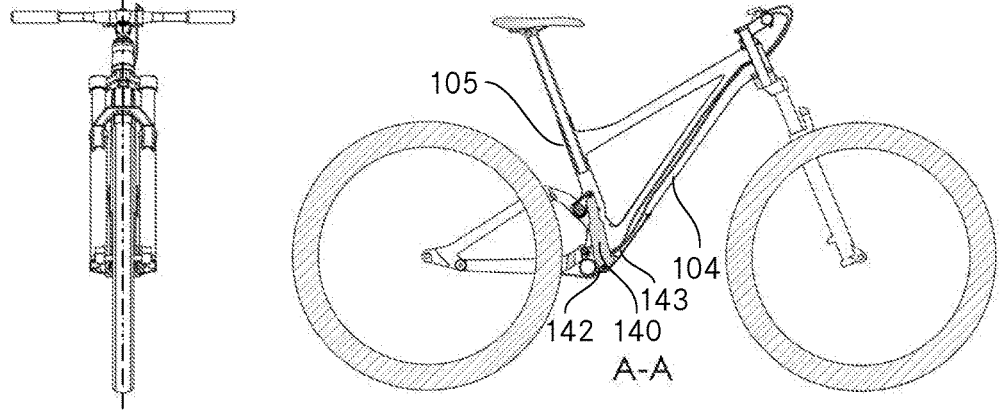
Fig. 2B
Fig. 2D
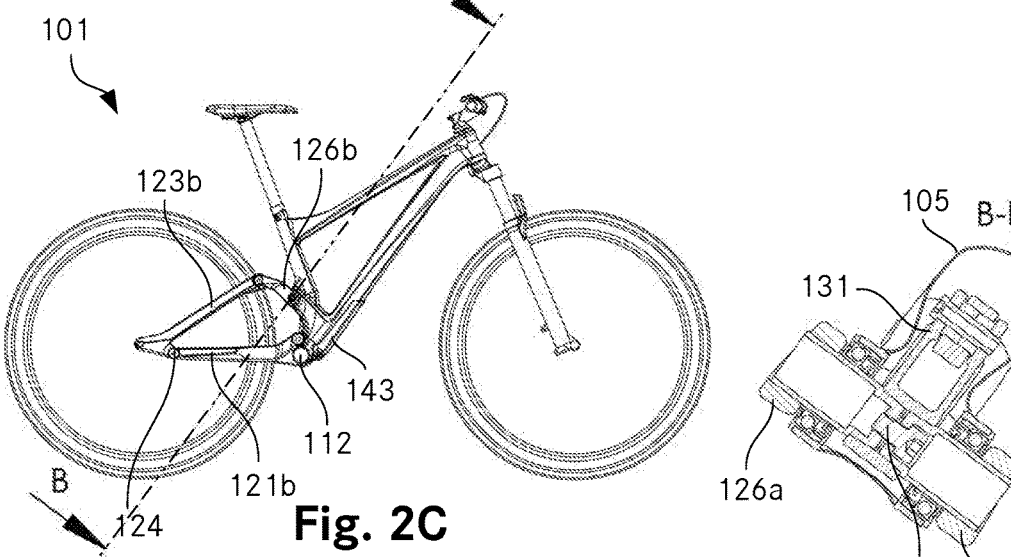
Fig. 2C
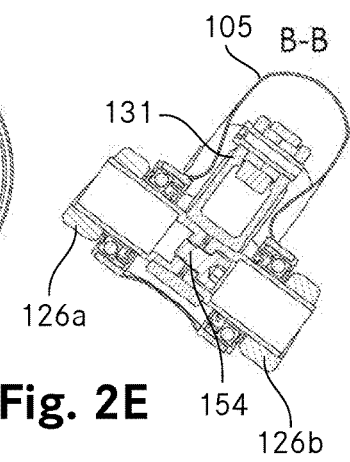
Fig. 2E

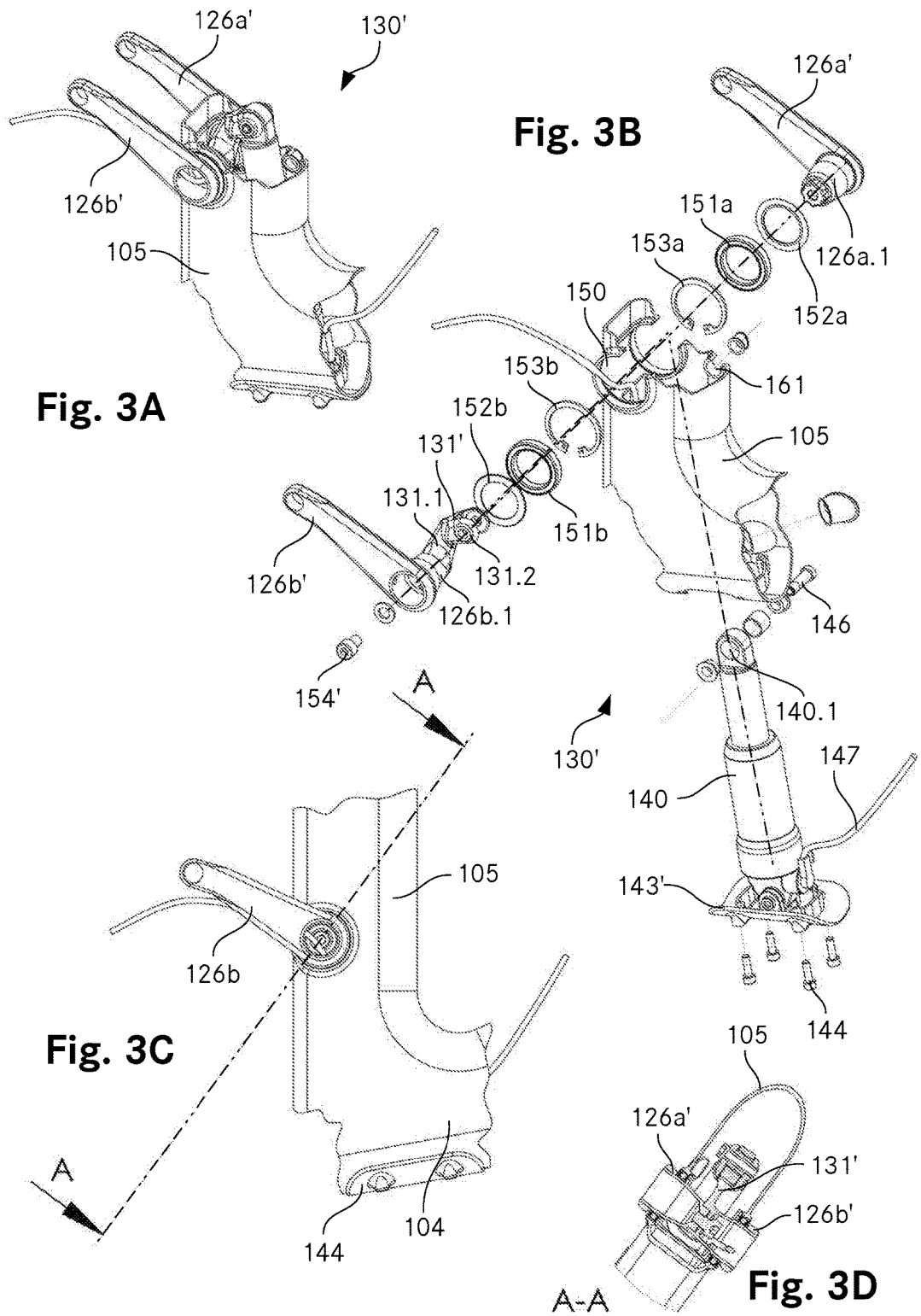

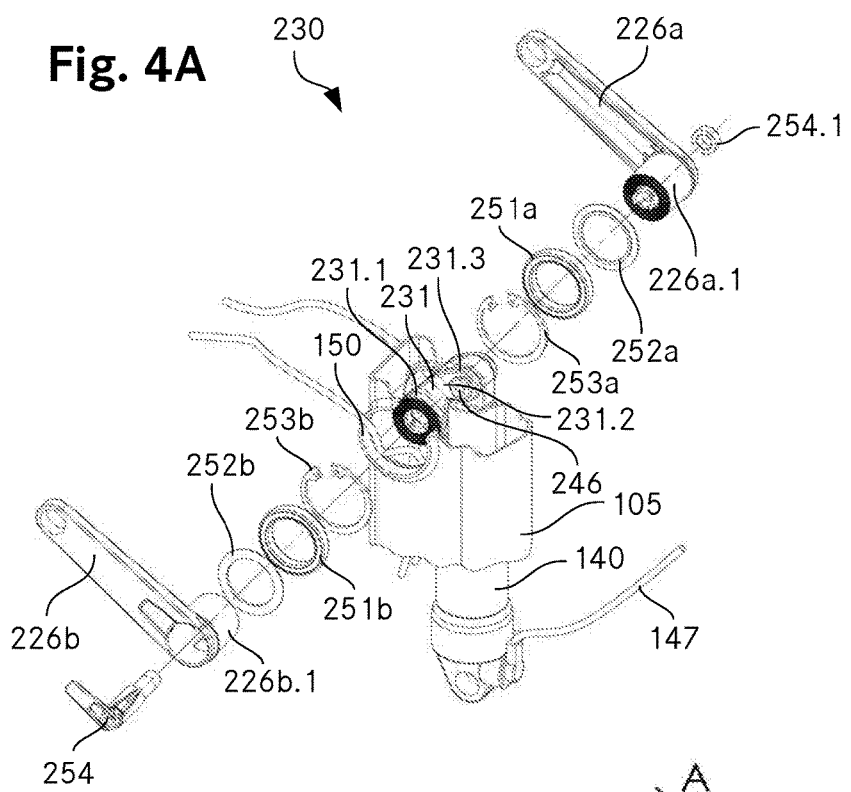
Fig. 4A
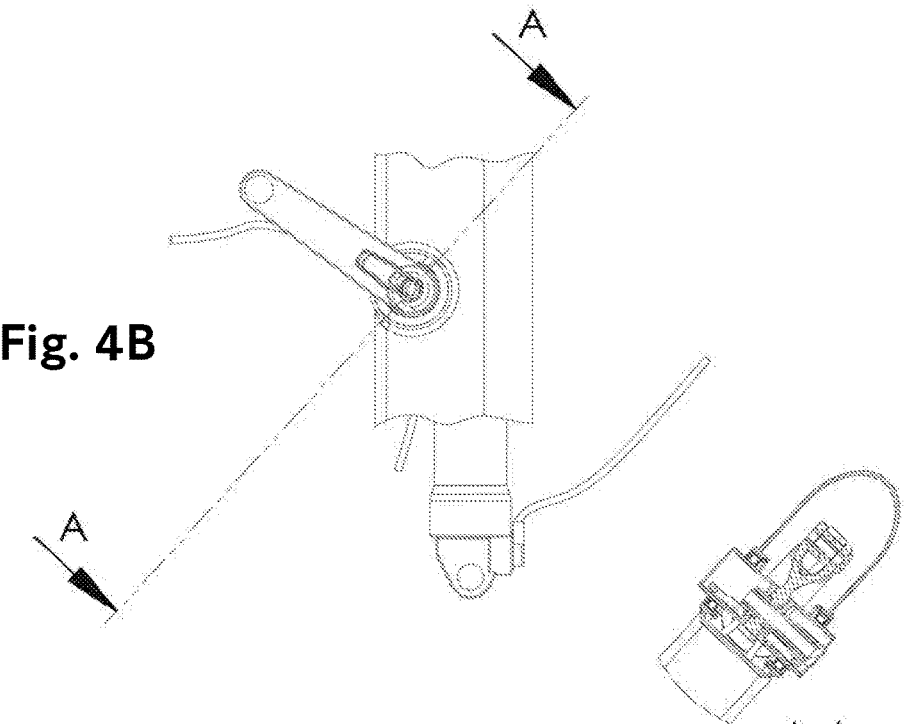
Fig. 4B
Fig. 4C

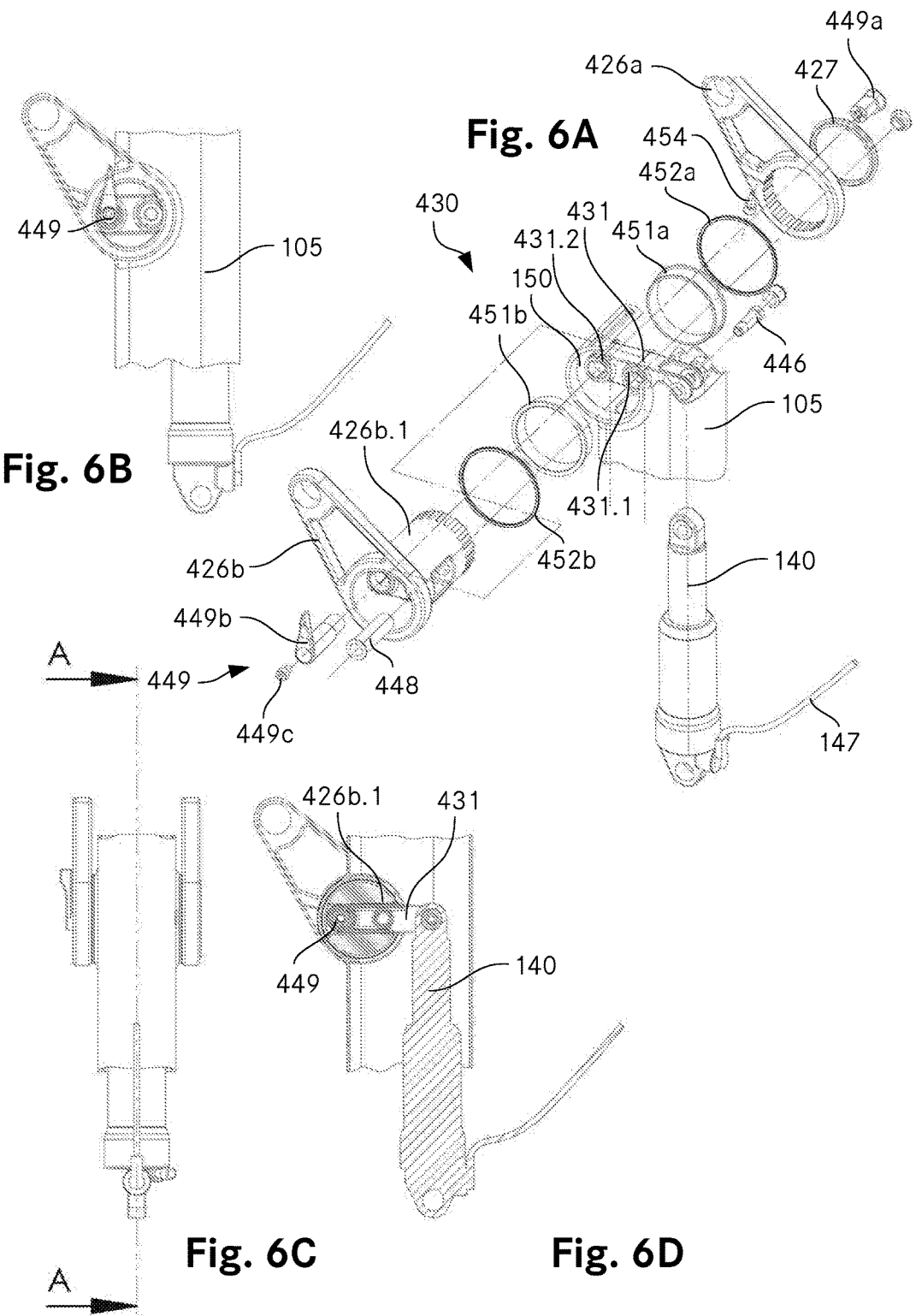

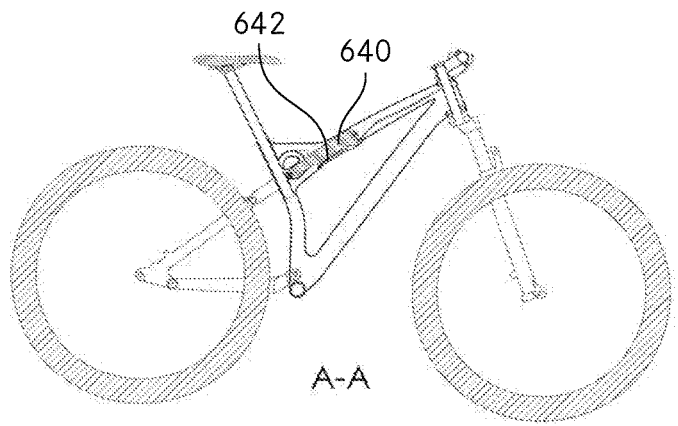
Fig. 8D
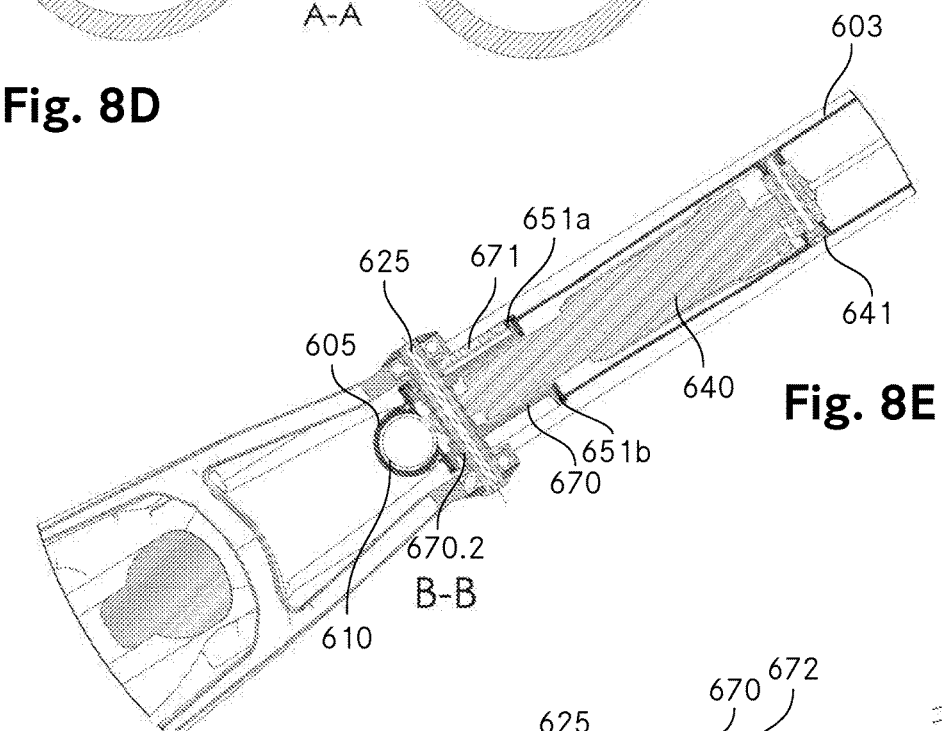
Fig. 8E
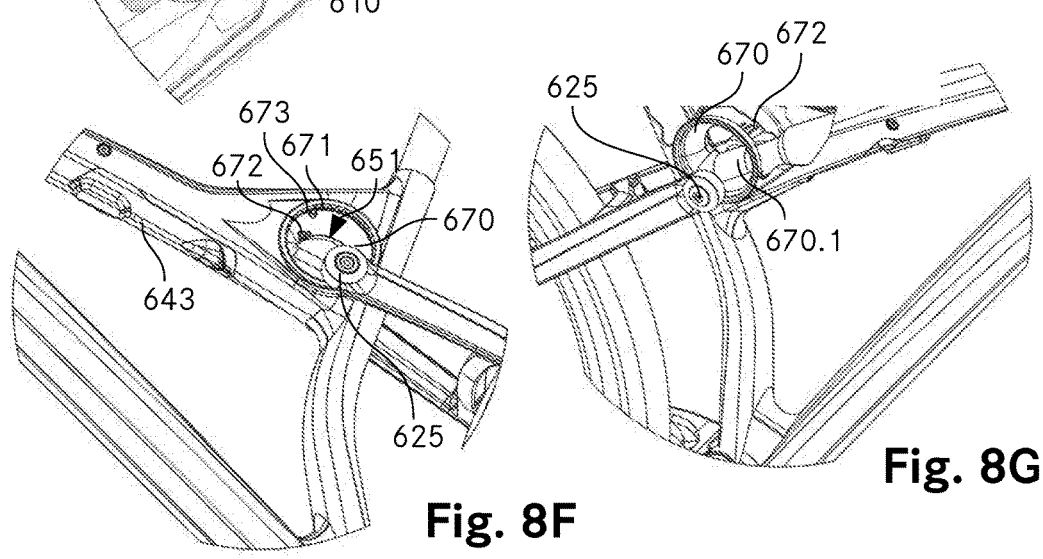
Fig. 8F
Fig. 8G

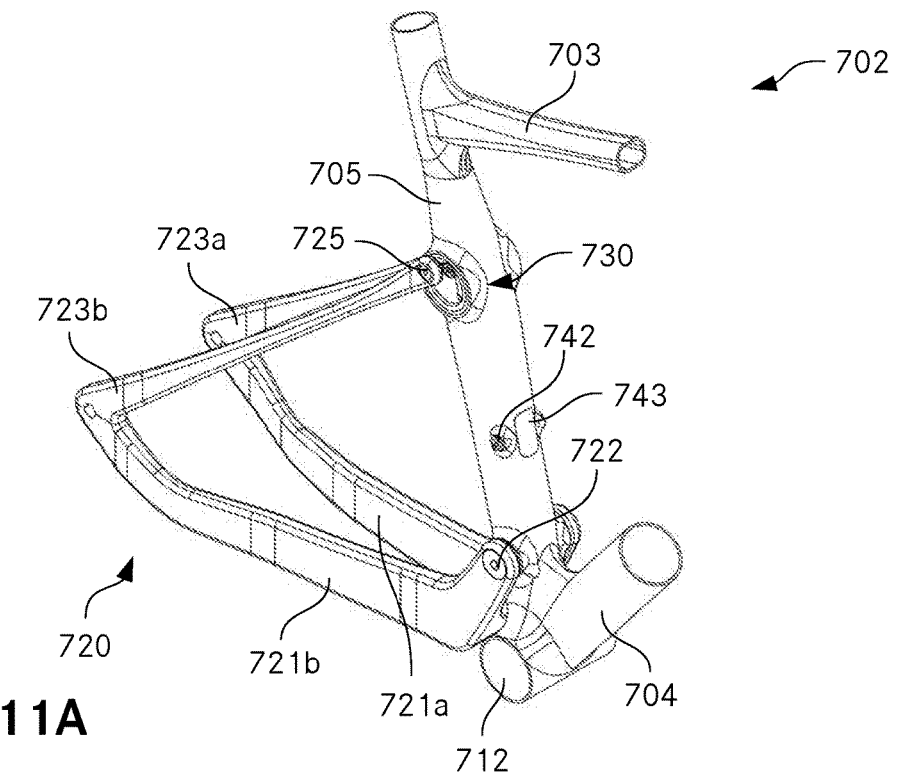
Fig. 11A
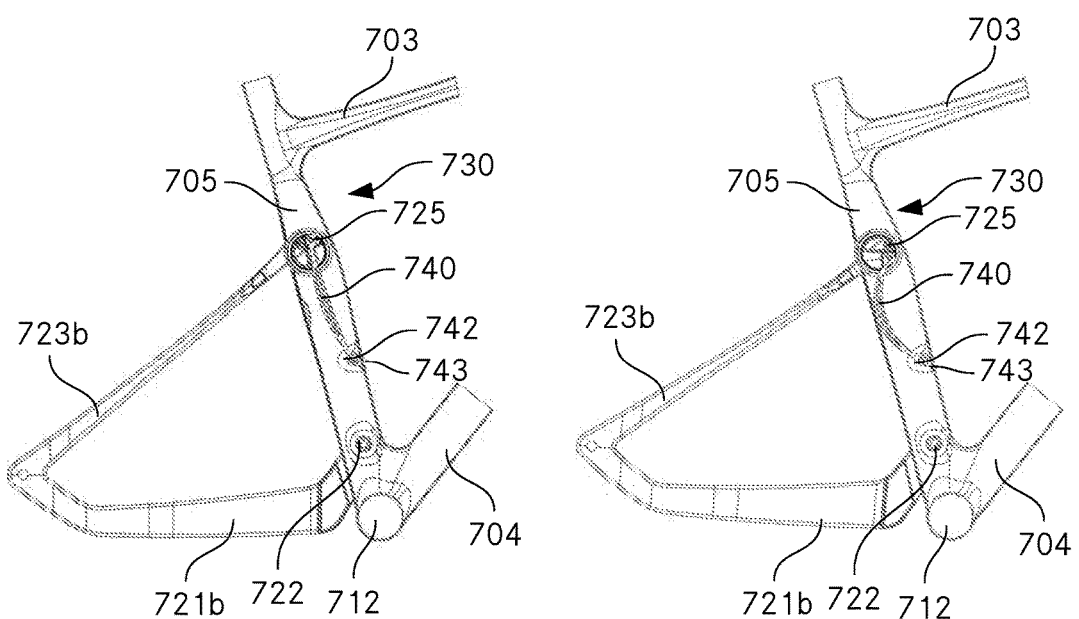
Fig. 11B
Fig. 11C

TWO-WHEELED VEHICLE WITH REAR-WHEEL SUSPENSION

TECHNICAL FIELD

The invention relates to a two-wheeled vehicle having a rear-wheel suspension arrangement, comprising a frame with at least one frame tube, a swing arm assembly, which is mounted on the frame, for the suspension of a rear wheel, a linear spring/damper element, and a transmission mechanism which is operatively connected at one side to the spring/damper element and at the other side to the swing arm assembly. The spring/damper element is received in a receiving chamber within the frame tube.

PRIOR ART

Two-wheeled vehicles, in particular bicycles, with a rear-wheel suspension arrangement are known. In general, the suspension arrangement leads to a reduction of the forces that act on the rider in the event of unevennesses in the ground being traveled upon. Traction is also improved. Specifically in the case of bumpy ground, a rear-wheel suspension arrangement therefore improves traveling comfort and permits greater performance. Here, touring bicycles, marathon and cross-country mountain bikes and racing bikes make do with relatively short spring travels, and in the case of free-ride, downhill, all-mountain and enduro bicycles, relatively long spring travels are necessary, such that the suspension arrangement is active even during jumps or in downhill off-road situations.

Numerous different constructions for the rear-wheel suspension arrangement exist. Aside from different spring travels, these differ also with regard to spring action, damping and individual spring characteristic. The simplest solution is single-joint suspension arrangements in which the rear wheel is mounted on a swing arm which can move about a center of rotation (normally in the vicinity of the pedal-crank bearing). In order to enable the rear wheel to also perform spring-compression movements in the direction of load, that is to say obliquely rearward and upward, more complex constructions with swing arm assemblies with up to four or even more joints are available on the market. Below, the expression "swing arm assembly" is to be understood to mean any rear-wheel suspension configuration for a bicycle with a rear-wheel suspension arrangement, whether it be with one, up to four, or even more centers of rotation or joints. The swing arm may furthermore—as is conventional in bicycle engineering—be of two-armed or one-armed design.

Bicycle rear-wheel suspension arrangements generally comprise at least one spring/damper element. This often comprises a linear steel or pneumatic spring and an oil damping arrangement. By way of a suitable mechanism, forces are transmitted from the swing arm assembly to the spring/damper element.

Linear spring/damper elements are normally fastened, by way of one of their ends, to a bearing point which is fixedly connected to the main frame, wherein the spring/damper element comes to be situated outside the frame tubes. This arrangement however harbors the risk of fouling, and can restrict the frame design. Furthermore, said arrangement may also be disadvantageous from an aesthetic aspect and with regard to aerodynamics. It has therefore already been proposed on several occasions that the spring/damper element be accommodated within a frame tube. Accordingly, U.S. Pat. No. 7,104,562 B2 (M. Gingl) presents a rear-wheel suspension arrangement with a swing arm, the pivot bearing of which is formed coaxially with the pedal-crank bearing. The swing arm is connected rotationally conjointly to a pivot lever, wherein the latter articulates a linear spring/damper element which is arranged within the frame. The swing arm emerges from the pedal-crank bearing region of the frame rearwardly in a substantially horizontal direction, that is to say radially with respect to the rotary axis of the pivot bearing. For this purpose, in the frame, there is formed a corresponding radial, sector-shaped slot, the extent of which is selected such that the swing arm is movable relative to the frame in the required angle range.

A further solution is presented in FR 2 765 854 (Rhône Alpes Soudure Sàrl). The linear spring/damper element is accommodated in the top tube of the frame. In the region of the movable end of the spring/damper element, the top tube has, laterally, two slots through which an axle fastened to the spring/damper element emerges. The length of the slots is selected such that the axle is movable linearly along the required spring travel. In each case one lever is rotatably mounted, at one end thereof, on both sides of the axle, and the other ends of the levers are in turn rotatably connected to the swing arm assembly of the bicycle.

The known solutions are not convincing, from a variety of aspects. For example, both the lateral slots in the top tube and the sector-shaped opening in the pedal-crank bearing region harbor the risk of dirt ingressing and adversely affecting the function of the spring/damper element and/or of the axle for the transmission of the forces from the swing arm assembly to the spring/damper element. The actuation of the linear spring element through lateral slots furthermore makes it impossible for forces arising from twisting of the swing arm to be supported. Such forces are transmitted directly to the spring/damper element. The use of an axle guided linearly in a slot can specifically also cause undesired noises.

PRESENTATION OF THE INVENTION

It is an object of the invention to provide a two-wheeled vehicle with a rear-wheel suspension arrangement, such as falls within the technical field mentioned in the introduction, in the case of which the risk of fouling of the spring/damper element is reduced.

The object is achieved as defined by way of the features of claim 1. According to the invention, the transmission mechanism is designed, and mounted on the frame, such that it transmits a force between the spring/damper element and swing arm assembly via a rotary axis which runs through an axial opening in the frame tube.

Because a rotary axis of said type can be implemented with relatively small dimensions, the influence on the frame stability can be minimized. Furthermore, the transmission mechanism according to the invention permits a flexible arrangement of the rotary axis; said rotary axis does not imperatively need to be situated either in the region of the pedal-crank bearing or in the top tube. Correspondingly, it is also possible for the spring/damper element to be accommodated in different regions of the frame, specifically in the seat tube, in the down tube, in the top tube or in a further frame tube of frame constructions that are available nowadays.

The linear spring/damper element may involve conventional, commercially available components, which include for example a pneumatic or helical spring and an oil damping arrangement. Other solutions are however also possible. Accordingly, the linear spring/damper element may be formed for example by a leaf spring, the length of which (between its two ends) may vary owing to its deformation. The leaf spring may be equipped with integrated or external damper elements.

If, aside from the spring/damper unit itself, the spring/damper element has further space-intensive components, for example electrical or electromagnetic elements, possibly with corresponding energy supply, said further components may also be accommodated within the frame.

The transmission mechanism is operatively connected at one side to the spring/damper element and at the other side to the swing arm assembly. This means that forces are transmitted between the swing arm assembly and spring/damper element exclusively or predominantly by way of the transmission mechanism.

The statement that the spring/damper element is received in a receiving chamber within the frame tube does not imperatively mean that the element must be entirely enclosed by the frame tube. Sections of the spring/damper element which are secondary in terms of their extent, in particular in the region of that end which is not operatively connected to the transmission mechanism, may be arranged outside the frame tube, and enclosed for example by a cover fastened to the frame. The receiving chamber may be specifically adapted to the spring/damper element, or is simply an adequately large region of the interior of the frame tube.

The rotary axis of the transmission mechanism runs through an axial opening in the frame tube, that is to say the opening is arranged substantially laterally on the frame tube, and the rotary axis is substantially parallel to the rotary axis of the rear wheel and to the rotary axis, or rotary axes, of the swing arm assembly.

The invention can be used in the context of the widely used two-armed swing arms with wheel suspension arrangements on both sides, but also in the context of one-armed swing arms. In the former case, it is preferable for two axial openings to be provided in the frame tube, which axial openings are arranged on both sides and are in alignment with one another. In this case, the rotary axis extends through the frame tube from one frame side to the opposite frame side. It should be noted that, here, the expression "rotary axis" describes not a physical component but a functional axis which may be realized by a single component or by multiple components that are fixedly connected or are separable from one another.

The axial opening in the frame tube advantageously forms a bearing in which an axle element is mounted so as to be rotatable about the rotary axis. The axle element is thus supported on the axial opening, and there is thus no need for additional bearing elements arranged within and/or outside the frame tube. The frame tube may, in the region of the opening, be equipped with an axial flange which reinforces the edge of the opening. If the opening extends all the way through, for example if the axle element is provided for the articulation of a two-armed swing arm, the mouths at both sides may even be connected by an axial tube which is only partially apertured in order to permit direct or indirect contact between the axle element and the spring/damper element.

In the axial opening there is preferably held a bearing bushing, wherein, in a first preferred embodiment, the bearing is in the form of a plain bearing. Plain bearings are well suited to the usage situation according to the invention, in particular in the case of relatively large bearing diameters, are relatively inexpensive, require little maintenance, are durable and are lightweight. Corresponding plain bearing bushings can for example be pressed into openings of circular shape.

In a second preferred embodiment, in particular in the case of bearings of relatively small diameter being used, use is made of other bearing types, for example ball bearings, roller bearings or needle-roller bearings.

In a preferred embodiment with a two-armed swing arm, the axle element is of at least two-part construction and has an axial parting point. In this way, the installation of the transmission mechanism is simplified: the two or more parts of the axle element, with which further elements, for example pivot arms situated outside or within the frame tube, may be fixedly connected or integrally formed, can thus be inserted into the frame tube from both sides through the openings and subsequently connected to one another. Between the two or more parts, use may be made of connecting elements such as are known per se, for example connecting elements such as are known from the field of bicycle cranks. For example, elements with a toothing on the face side and/or on the shell, which elements can be secured against one another in an axial direction by way of a securing mechanism, are suitable.

In a first preferred embodiment, the axle element is of two-part construction, wherein one of the parts has both a pivot arm, which in the installed state is situated outside the frame, and a transmission arm, which in the installed state is situated within the frame and which has a bearing point which is eccentric with respect to the rotary axis of the axle element, that is to say both the pivot arm and the transmission arm are formed integrally with one another. Said axle element part is formed such that the transmission arm situated within can, for the installation of the axle element, be inserted through the axial opening in the frame tube. For this purpose, the part may have narrowed portions in a region which is received within the bearing in the frame tube in the installed state, and the clear diameter of the transmission arm is smaller than the internal diameter of the bearing for the axle element.

Alternatively, the axle element is of unipartite construction, that is to say the same element extends all the way through the axial opening in the frame tube and interacts, possibly on both sides, with in each case one bearing received in the opening. In order that the element can be installed, it is possible, after the insertion of the axle element, for an internally situated transmission arm to be fastened to said axle element, or the articulation point for the spring/damper element is—as discussed further below—situated in that region of the receiving chamber which is situated axially behind the axial opening in the frame tube.

In a preferred embodiment, the axle element comprises a quick-action clamping mechanism for the separation and fixing of the at least two parts of the axle element. It is thus possible for the transmission mechanism to be quickly and easily released and fixed, thus facilitating installation and repair work.

The spring/damper element is preferably articulated on the axle element eccentrically with respect to the rotary axis. The linearly acting force of the element thus generates a torque about the rotary axis of the axle element, that is to say the linear force is converted into a rotational force.

The eccentric articulation may be realized by way of a lever which is connected rotationally conjointly to, or formed integrally with, the axle element, though it is also possible for the axle element itself to be designed so as to have an eccentric articulation point.

Depending on the geometry of the transmission mechanism, the spring/damper element is, at the end that is not directly operatively connected to the transmission mechanism, mounted on the frame so as to be pivotable slightly about a rotary axis situated there. It is thus possible for the spring/damper element to jointly perform angle changes arising owing to the path of its articulation point on the transmission mechanism.

An articulation point of the spring/damper element is advantageously positioned in a region, situated axially behind the axial opening in the frame tube, of the receiving chamber. The articulation point is thus readily accessible through the axial opening—if appropriate when the axle element has been (partially) removed. The installation and dismounting of the transmission mechanism and of the spring/damper element are thereby greatly simplified.

The swing arm assembly is preferably articulated on the axle element eccentrically with respect to the rotary axis. A primarily linearly acting force of the swing arm assembly thus generates a torque about the rotary axis of the axle element, that is to say the linear force is converted into a rotational force.

Alternatively, an element of the swing arm assembly may, with respect to the rotary axis, be connected rotationally conjointly to the axle element, that is to say the forces of the swing arm assembly are transmitted rotationally to the axle element.

In a preferred embodiment, an articulation point of the swing arm assembly is positioned in a spatial region which encompasses an opening area of the opening and the regions situated axially behind and in front of said opening area. The swing arm assembly is thus coupled to the transmission mechanism in the region of the opening in the frame tube. This permits a simple and esthetically particularly advantageous construction.

Alternatively, the articulation point is situated outside said spatial region, for example at the free end of a lever which is connected rotationally conjointly to the axle element.

In the case of a transmission mechanism for a two-armed swing arm, the articulation point for the spring/damper element is advantageously situated in the axial direction between the two axial openings and the respective bearing rings, whereas two articulation points for the swing arm assembly are situated on both sides, axially outside the axial openings.

In a preferred embodiment, the axle element is formed by a hollow cylindrical sleeve, wherein the articulation point of the spring/damper element is arranged in an inwardly directed recess of the sleeve. The articulation point is thus situated on the outer side of the sleeve, which is advantageously sealed against an ingress of dirt; that is to say the articulation point is—like the spring/damper element as a whole—protected by the sleeve against fouling with dirt that could ingress through the opening in the frame tube.

At least one ventilation opening is advantageously provided in the hollow cylindrical sleeve and/or in a cover of a frame opening which provides access to the spring/damper element. Said ventilation opening serves for generating air circulation in the region of the spring/damper element, and thus for the cooling thereof. The ventilation opening is preferably arranged so as to be protected against weather influences and the ingress of dirt. Alternatively or in addition, it is also possible for ventilation openings to be provided in the frame tube in which the spring/damper element is accommodated.

It is preferable for an angle between an articulation point of the spring/damper element and an articulation point of the swing arm assembly to be adjustable. In this way, it is possible for the frame geometry to be adapted in a simple manner. The possibility for adjustment can be realized in a variety of ways; for example, it is possible for the position of the articulation point of the swing arm assembly and/or the position of the articulation point of the spring/damper element relative to the axle element to be varied, or the articulation point of the swing arm assembly and the articulation point of the spring/damper element are situated on two parts, which can be separated from one another and which can be fixed to one another in different angular positions, of the axle element.

Alternatively, the geometry in the region of the transmission element is fixedly predefined. If appropriate, other possibilities for adjustment may be provided, for example in the region of the swing arm assembly.

The two-wheeled vehicle according to the invention preferably has a control element, which can be actuated by a force transmission line, for the locking and unlocking and/or adjustment of the angle between the articulation point of the spring/damper element and the articulation point of the swing arm assembly. The angle can thus be adjusted by the user, by way of a conventional actuation element, without the user having to dismount. The force transmission line may in particular be a hydraulic line or a Bowden cable.

The control element may merely enable or lock the adjustment of the angle, for example by virtue of elements that are operatively connected to one another by way of a toothing being released from one another, or the actuation of said control element leads directly to the adjustment of the angle, for example by virtue of two elements interacting with one another by way of different abutment surfaces in a manner dependent on the position of the control element.

Alternatively, the locking or unlocking is realized directly in the transmission element, for example by way of a quick-action clamping means.

The at least one frame tube advantageously comprises a further opening, wherein the spring/damper element, in the state in which it is released from the transmission mechanism, can be removed from the frame tube through said further opening in a direction perpendicular to the axial direction. The axial openings and the further openings need not be situated in the same frame tube or in the same frame section; accordingly, it is for example possible for the axial openings to be arranged in the seat tube, and for the further opening to be arranged in the down tube.

The further opening permits simple installation and dismounting of the spring/damper element. An additional opening is however not imperatively necessary accordingly, it is conceivable for the spring/damper element to be accommodated for example in the seat tube, and to be accessed through the upper opening for the insertion of the saddle support.

The bicycle according to the invention advantageously also comprises a cover for closing off the further opening. Said cover may have a load-bearing function for the spring/damper element, or serves merely for the protection of the element and of the frame interior against fouling and other negative influences. If the cover is arranged in the region of the down tube, it may simultaneously serve as a down tube guard, such as is often used in the case of a frame composed of carbon.

The cover may be screwed to the frame, though other fastening types are also possible. A clip fastening, by way of which the cover can be removed and attached without the use of tools, is particularly advantageous. In this case in particular, it is possible for a receiving chamber for further articles, for example a tool or a toolset, to be provided behind the cover or on the inner side of the cover.

If the spring/damper element comprises a pneumatic spring, the cover may comprise an opening through which a valve of the element can have contacted to it, from the outside, an air pump.

The spring/damper element may be operable from the handlebar, for example for the purposes of activating a lockout or adapting the spring/damper characteristic in some other way. The operation is performed for example via a hydraulic line or a Bowden cable, though may also be realized by way of a signal line or wirelessly by way of radio technology.

Further advantageous embodiments and combinations of features of the invention will emerge from the following detailed description and from the patent claims in their entirety.

BRIEF DESCRIPTION OF THE DRAWINGS

In the drawings used for the explanation of the exemplary embodiment:

FIGS. 2A-E show a first embodiment of a bicycle according to the invention;

FIGS. 3A-D show a first variant of the transmission mechanism of the first embodiment;

FIGS. 4A-C show a second variant of the transmission mechanism of the first embodiment;

FIGS. 6A-D show a fourth variant of the transmission mechanism of the first embodiment;

FIGS. 8A-G show a second embodiment of a bicycle according to the invention;

FIGS. 11A-C show views of a third embodiment of a bicycle according to the invention;

It is basically the case that identical parts are denoted by the same reference designations in the figures.

WAYS OF IMPLEMENTING THE INVENTION

Figure 1A:
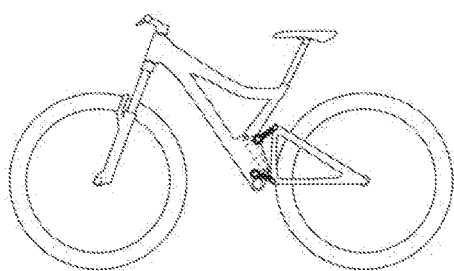
FIGS. 1A-U show possible arrangements of the rear-wheel suspension arrangement according to the invention.
Figure 1B:
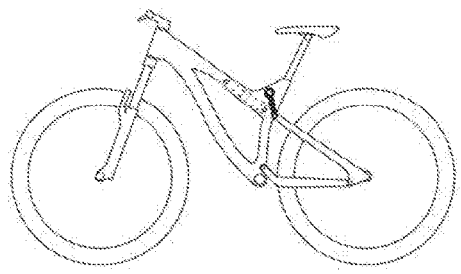
Figure 1C:
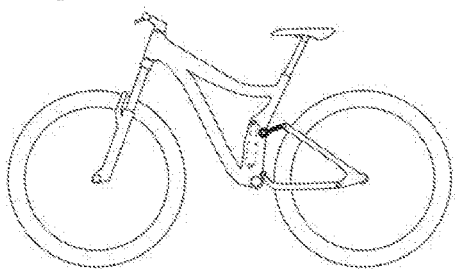
Figure 1D:
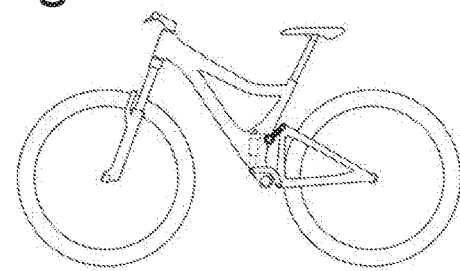
Figure 1E:
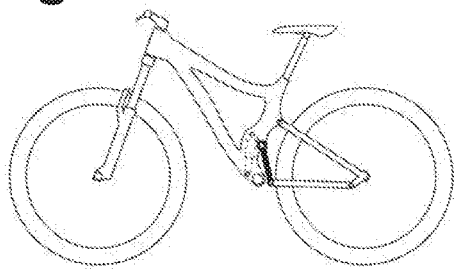
Figure 1F:
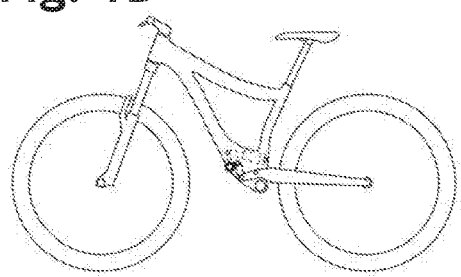
Figure 1G:
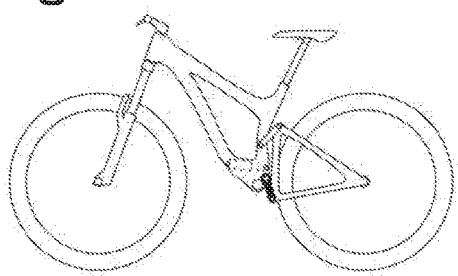
Figure 1H:
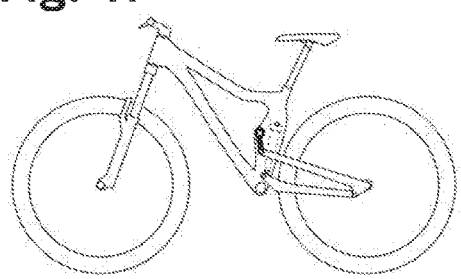
Figure 1I:
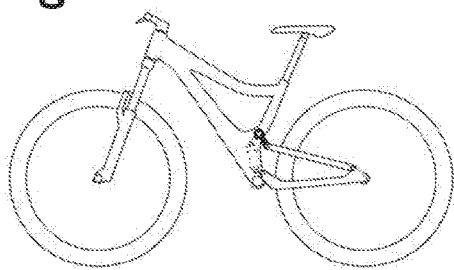
Figure 1K:
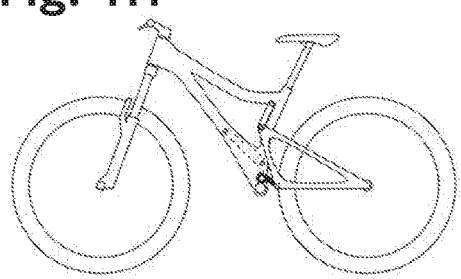
Figure 1L:
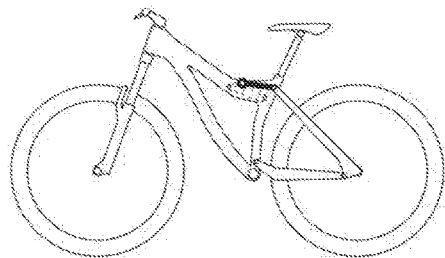
Figure 1M:
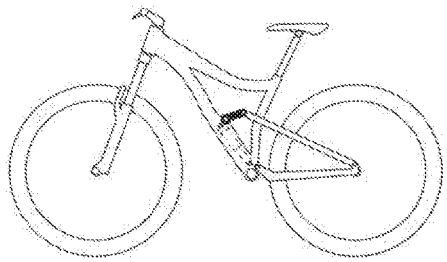
Figure 1N:
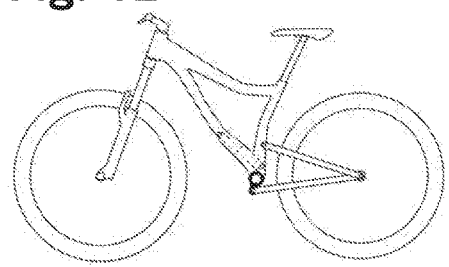
Figure 1O:
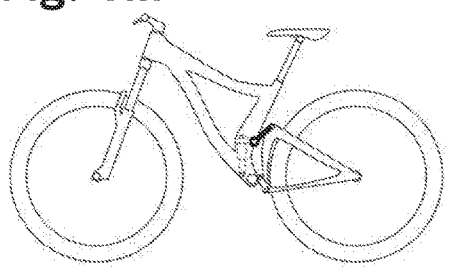
Figure 1P:
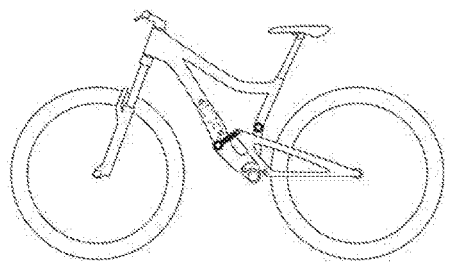
Figure 1Q:
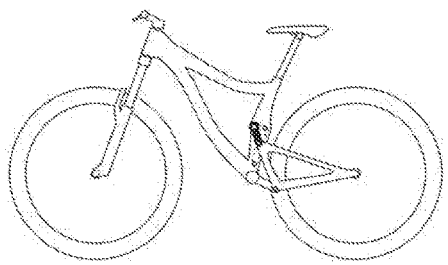
Figure 1R:
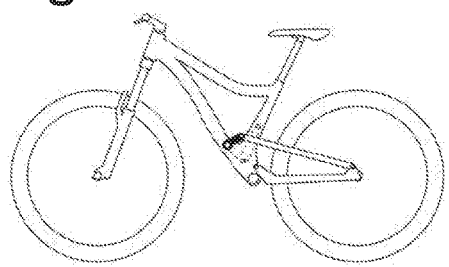
Figure 1S:
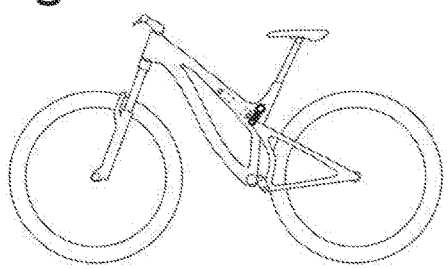
Figure 1T:
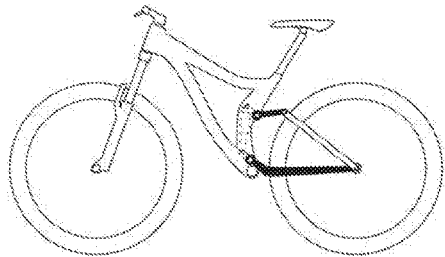
Figure 1U:
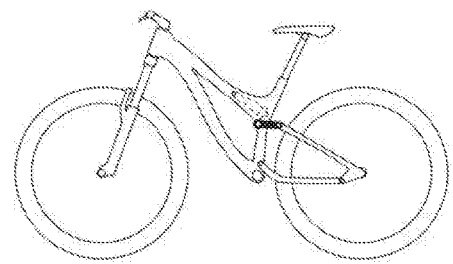

FIGS. 1A-1U show possible arrangements of the rear-wheel suspension arrangement according to the invention. The bicycle is in each case illustrated merely schematically. The construction of the swing arm assembly for the rear wheel, and the arrangement of the spring/damper element and of the transmission mechanism between spring/damper element and swing arm assembly, differ from example to example.

As can be seen from the figures, the spring/damper element may, at one end thereof, be fixedly attached to the frame, with only the other end interacting, by way of the transmission mechanism, with the rocker arm assembly (cf. FIGS. 1B-1S, 1U). The spring/damper element may also, by way of both of its ends, interact directly with elements of the swing arm assembly (cf. FIGS. 1A and 1T).

The spring/damper element may be accommodated inter alia in the top tube (cf. FIGS. 1B, 1L, 1S, 1U), in the seat tube (cf. FIGS. 1C, 1H, 1Q, 1R), in the down tube (cf. FIGS. 1K, 1M, 1N, 1P) or in a transition region between the down tube and seat tube, close to the pedal-crank bearing (cf. FIGS. 1A, 1D-G, 1I, 1O, 1T).

The length of the eccentric, that is to say the spacing between the rotary axis for the transmission of the force between spring/damper element and rocker arm assembly and the fastening point on the rocker arm assembly, may likewise be selected differently. The same applies to the angle and angle range through which the fastening point is movable about the rotary axis, and to the location of the rotary axis on the frame. In the embodiment illustrated in FIG. 1N, it is even the case that the rotary axis coincides with that of the pedal-crank bearing.

It can be clearly seen from FIGS. 1A-1U that the transmission according to the invention of forces between the swing arm assembly and spring/damper element can be implemented in the context of most constructions that are used nowadays for the rear-wheel suspension arrangement.

FIGS. 2A-2E show a first embodiment of a two-wheeled vehicle according to the invention. FIG. 2A shows an oblique view, FIG. 2B shows a front view, and FIG. 2C shows a side view. FIG. 2D shows a section along the vertical plane A-A indicated in FIG. 2B. FIG. 2E shows a section along the plane B-B indicated in FIG. 2C, which plane runs obliquely through the transmission mechanism.

The bicycle 101 as per the first embodiment comprises, such as is known per se, a frame 102 with a top tube 103, a down tube 104, and a seat tube 105, which form a triangular frame. Arranged on the front end of the top tube 103 and of the down tube 104 is the steering tube 106, in which the front-wheel fork 107 is mounted so as to be rotatable about the steering axis. The front-wheel fork 107 bears the front wheel 108, and is connected rotationally conjointly at its upper end to the handlebar 109.

A saddle support 110 with a saddle 111 is inserted into the seat tube 105 and secured by way of a conventional clamping device. Further components, such as brakes, gear mechanism etc., are likewise provided and are designed and arranged in a manner known per se, but have been omitted from the figures in order to provide a better overview.

The rotary axis of the rear wheel 113 is mounted on a swing arm assembly 120. Said swing arm assembly comprises, at both sides, in each case one lower swing arm 121a, 121b, which lower swing arms are mounted so as to be pivotable about an axial rotary axis 122 directly above the pedal-crank bearing 112, and which lower swing arms extend rearward from said rotary axis 122 substantially in a horizontal direction. In turn, upper swing arms 123a, 123b are mounted, pivotably about an axial rotary axis 124, on the lower swing arms 121a, 121b. Said upper swing arms comprise a rear limb, which extends further rearward from the rotary axis 124 substantially horizontally and which, in the region of its free end, bears the rear-wheel axle, and a front limb, which extends obliquely forward and upward from the rotary axis 124.

Close to their free ends, the front limbs of the upper swing arms 123a, 123b are articulated, by way of a further axial rotary axis 125, by pivot levers 126a, 126b. Said pivot levers 126a, 126b are part of a transmission mechanism 130 which is described in more detail in conjunction with FIG. 3 and which couples the pivot levers 126a, 126b to a spring/damper element 140. The spring/damper element 140 is accommodated in a lower region of the seat tube 105 and is, in the installed state, situated immediately in front of the pedal-crank bearing 112. At its lower end, said spring/damper element is screwed by way of axial screws 141 to the frame 102. An opening 142 in the down tube 104 for the insertion and removal of the spring/damper element is closed off by way of a cover 143, which is likewise fastened by way of multiple screws to the frame 102. One of said screws interacts with an internal thread of the screw 141 by way of which the spring/damper element 140 is fastened to the frame. A corresponding additional fastening point to the frame is made superfluous in this way. The cover 143 simultaneously serves as a down tube guard.

FIGS. 3A-D show a first variant of the transmission mechanism 130 of the first embodiment. The transmission mechanism substantially corresponds to that shown in FIG. 2. Differences that exist will be discussed below. FIG. 3A is an oblique view, FIG. 3B is an exploded illustration, FIG. 3C is a side view, and FIG. 3D shows a cross section along the plane A-A indicated in FIG. 3C.

As already shown in conjunction with FIG. 2, the transmission mechanism 130' is accommodated in the seat tube 105. Said transmission mechanism is coupled to the pivot levers 126a', 126b'. The latter are forged, in hollow form, from aluminum (embodiments composed of carbon, magnesium, fiber-reinforced plastic or steel are likewise possible). The two pivot levers 126a', 126b' are mounted in an axially oriented opening 150, provided on both sides, in the seat tube 105, and are connected rotationally conjointly to a transmission lever 131'. The transmission lever 131' is likewise forged, in hollow form, from aluminum (again, embodiments composed of carbon, magnesium, fiber-reinforced plastic or steel are likewise possible). Said transmission lever is, in the installed state, coupled rotatably to the free upper end of the spring/damper element 140. By contrast to the illustration in FIG. 2, the lower end of the spring/damper element is in this case mechanically connected to a cover 143', whereas the cover 143' is screwed by way of screws 144 to the down tube 104. The support of the spring/damper element on the frame is thus realized via the cover 143'.

As shown in FIG. 3B, it is readily possible for cables or hydraulic lines to be led through the transmission mechanism 130, from the frame through the axle of the pivot levers into one of the pivot levers, and onward into the rocker arm assembly. The cables or lines are thus well protected and are subjected to little mechanical loading, and a further opening in the frame for the leadthrough of the cables is made superfluous.

The individual components of the transmission mechanism 130' will be described in more detail below. One of the pivot levers 126a', in this case the left-hand pivot lever, comprises, on its front end which in the installed state engages into the opening 150, an axle piece 126a.1, which is cylindrical in a first external region, which then comprises a conically tapering second region, and which finally has a face region with a radially encircling external toothing.

The second pivot lever 126b', in this case the right-hand pivot lever, likewise comprises, on its front end which in the installed state engages into the opening 150 from the other side, an axle piece 126b.1 with firstly a first external cylindrical region and subsequently a conically tapering region. Along the axle, this is followed by a face region with a radially encircling internal toothing, the geometry of which is matched to the external toothing of the other axle piece 126a.1. Furthermore, adjoining the conically tapering region, the transmission lever 131' is formed integrally with the second pivot lever 126b'.

The transmission lever 131' comprises a first section 131.1, which runs radially with respect to the rotary axis, and a section 131.2, which is angled relative to said first section by approximately 45°. Said angled section bears, on its free end, a fork with two eyelets which are aligned with one another.

The opening 150 in the frame tube 105 has pressed into it, at both sides, a ball bearing 151a, 151b; such bearings are advantageous in conjunction with carbon frames. If an aluminum frame is used, it is in particular also possible, aside from pressed-in bearings, for use to be made of common screwed-in bearings. Suitable bearings are basically known, for example from the region of the pedal-crank bearing.

The axle pieces 126a.1, 126b.1 of the two pivot levers 126a', 126b' are now mounted, by way of their cylindrical sections, in the ball bearings 151a, 151b. Between the pivot levers 126a', 126b' themselves and the face side of the ball bearings 151a, 151b, there are arranged bearing protection rings 152a, 152b, and within the ball bearings 151a, 151b there are arranged clamping rings 153a, 153b, which form an inner stop for the bearing rings themselves.

The two pivot levers 126a', 126b' are mounted rotationally conjointly on one another by way of their face-side toothings; they are secured against one another axially, after insertion into the opening 150, by way of a screw 154'.

The upper end of the spring/damper element is fastened rotatably to the angled section 131.2 of the transmission lever 131'. For this purpose, a plain bearing is received in an eyelet 140.1 of the spring/damper element, which plain bearing is enclosed on both sides by aluminum sleeves. After the positioning of the eyelet 140.1 in the fork formed in the angled section 131.2 of the transmission lever 131', a securing screw 146 is passed through the two eyelets of the fork and, between these, through the plain bearing in the eyelet 140.1 of the spring/damper element. The securing screw 146 has, on its free end, an external thread which interacts with an internal thread in the corresponding eyelet of the fork of the angled section 131.2 of the transmission lever 131'.

The spring/damper element 140 is a commercially available component with a linear pneumatic spring and an oil damping arrangement. In the region of the lower end that is fastened to the cover 143', there is connected a Bowden cable 147, by way of which the damping characteristic of the spring/damper element 140 can be adjusted in a manner known per se. The adjustment may also be performed not by way of a Bowden cable but by way of a hydraulic or electrical line or a wireless signal connection.

The transmission mechanism 130' is installed on the frame as follows: firstly, the clamping rings 153a, 153b and then the bearing rings of the ball bearings 151a, 151b are inserted or pressed into the opening 150 of the seat tube 150 on both sides. Subsequently, the right-hand pivot lever 126b' is, with its axle piece 126b.1 and the transmission lever 131', threaded through the corresponding bearing. This is possible because the clear outer diameter of the transmission lever, in particular the fork in the angled section 131.2, is smaller than the inner diameter of the ball bearing 151b. The threading-in is also made easier by way of the narrowing owing to the conically tapering section of the axle piece 126b.1. Subsequently, the axle piece 126a.1 of the other pivot lever 126a' is inserted axially through the corresponding bearing from the opposite side. The pivot levers 126a', 126*b*' are also, during the threading-in or insertion process, passed through the bearing protection rings 152*a*, 152*b*. The two pivot levers 126*a*', 126*b*' make contact in the region of their face region-side toothings, and, when correctly aligned with respect to one another, can be coupled rotationally conjointly to one another, such that the pivot levers 126*a*', 126*b*' are connected rotationally conjointly to one another. Said connection is secured axially by way of the screw 154'.

The spring/damper element 140 is fastened to the cover 143', which has not yet been mounted, and is subsequently inserted with its free end into the seat tube 105 from below. The eyelet of the spring/damper element 140 is pushed upward as far as into the region of an installation opening 161, and the pivot levers 126*a*', 126*b*' are then rotated about their rotary axis until the fork of the transmission lever 131' receives the eyelet of the spring/damper element 140. This process is facilitated by way of guides on the inner side of the fork of the transmission lever 131'. The screw 146 can then be inserted through the installation opening 161, by way of which screw the spring/damper element and the transmission lever 131' are connected to one another. After the connection of the pivot levers 126*a*', 126*b*' to the corresponding centers of rotation of the rocker arm assembly, it is now possible for forces to be transmitted from the rocker arm assembly via the pivot levers 126*a*', 126*b*', and the transmission lever 131', to the spring/damper element 140.

For dismounting, the screw 146 has, in the region of the screw head, a clamping mechanism and/or magnetic characteristics such that the screw head can be gripped by way of an engaged tool and pulled out through the installation opening 161. Alternatively, a further small maintenance opening may be provided on the side opposite the installation opening 161, which maintenance opening makes it possible for the screw 146 to be pushed out through the installation opening 161.

In the case of the transmission mechanism 130 illustrated in FIG. 2, it is primarily the case that the two pivot levers 126*a*, 126*b* and the transmission lever 131 are designed differently; specifically, three parts are provided rather than two. The transmission lever 131 which is formed as a separate element has, on both sides, axially inwardly conically tapering apertures which have axial ribs. The two pivot levers 126*a*, 126*b* engage from both sides, by way of correspondingly designed conical external surfaces with axial grooves, into the apertures in the transmission lever 131 (cf. FIG. 2E). The two pivot levers 126*a*, 126*b* are thus coupled rotationally conjointly to one another by way of the transmission lever 131. The axial securing action is realized by way of an axial screw 154 which connects the two pivot levers 126*a*, 126*b*.

FIGS. 4A-C show a second variant of a transmission mechanism 230 of the first embodiment. FIG. 4A is an exploded illustration, FIG. 4B is a side view, and FIG. 4C shows a cross section along the plane A-A indicated in FIG. 4B.

As already shown in conjunction with FIG. 2, the transmission mechanism 230 is accommodated in the seat tube 105. Said transmission mechanism is coupled to two pivot levers 226*a*, 226*b*. These are mounted in an axially oriented opening 150 on both sides in the seat tube 105, and are connected rotationally conjointly to a transmission lever 231. In the installed state, the transmission lever 231 is coupled rotatably to the free upper end of the spring/damper element 140. The lower end is again—as described in conjunction with FIG. 2 or FIG. 3—mechanically connected to the down tube of the bicycle.

The individual components of the transmission mechanism 230 will be described in more detail below. The two pivot levers 226*a*, 226*b* comprise, at their front ends which in the installed state engage into the opening 150, a cylindrical axle piece 226*a*.1, 226*b*.1. Said axle piece comprises a face region with a face-side toothing (for example a so-called Hirth toothing). The face side is additionally equipped with a sector-shaped web.

The transmission lever 231 likewise comprises a cylindrical axle piece 231.1. At both ends, the face sides are equipped with a toothing which is matched to the toothing of the axle pieces 226*a*.1, 226*b*.1 of the pivot levers 226*a*, 226*b*. The face sides furthermore each comprise a sector-shaped aperture for interaction with the webs of the axle pieces 226*a*.1, 226*b*.1, wherein the sector angle is greater than that of the webs. The webs and the apertures thus permit, even in the interacting state, a relative rotation between the axle pieces 226*a*.1, 226*b*.1 of the pivot levers 226*a*, 226*b* and the axle piece 231.1 of the transmission lever 231. Owing to the geometry of the webs and of the apertures, however, the possible angle of rotation is restricted to approximately 4°.

The transmission lever 231 furthermore comprises a first section 231.2, running radially with respect to the rotary axis, and a section 231.3 which is angled relative to said first section by approximately 45°. Said angled section bears, on its free end, a fork with two eyelets which are aligned with one another.

The opening 150 in the frame tube 105 has pressed into it, at both sides, a ball bearing 251*a*, 251*b*; such bearings are advantageous in conjunction with carbon frames. If an aluminum frame is used, it is in particular also possible, aside from pressed-in bearings, for use to be made of common screwed-in bearings. Suitable bearings are basically known, for example from the region of the pedal-crank bearing.

The axle pieces 226*a*.1, 226*b*.1 of the two pivot levers 226*a*, 226*b* are now mounted, by way of their cylindrical sections, in the ball bearings 251*a*, 251*b*. Between the pivot levers 226*a*, 226*b* themselves and the face side of the ball bearings 251*a*, 251*b*, there are arranged bearing protection rings 252*a*, 252*b*, and within the ball bearings 251*a*, 251*b* there are arranged clamping rings 253*a*, 253*b*, which form an inner stop for the bearing rings themselves.

The two pivot levers 226*a*, 226*b* are mounted, by way of their face-side toothings, rotationally conjointly on the respective face side of the axle piece 231.1 of the transmission lever 231, and the connections are secured axially by way of a quick-action clamping means 254 which interacts with a nut 254.1.

The upper end of the spring/damper element 140 is rotatably fastened to the angled section 231.3 of the transmission lever 131. For this purpose, a securing bolt 246 is passed through the two eyelets of the angled section 231.3 and, between these, through a corresponding eyelet of the spring/damper element, and is subsequently secured by known means.

The spring/damper element 140 is in turn a commercially available component with a linear pneumatic spring and an oil damping arrangement. In the region of the lower end, there is connected a Bowden cable 147, by way of which the damping characteristic of the spring/damper element 140 can be adjusted in a manner known per se. The adjustment may also be performed not by way of a Bowden cable but by way of a hydraulic or electrical line or a wireless signal connection.

The transmission mechanism 230 is installed on the frame as follows: firstly, the clamping rings 253a, 253b and the bearing rings of the ball bearings 251a, 251b are inserted or pressed into the opening 250 of the seat tube 150 on both sides. The spring/damper element 140 with installed transmission lever 231 is then inserted into the seat tube 105 from below and is fixedly held.

Subsequently, the two pivot levers 226a, 226b with their axle pieces 226a.1, 226b.1 are threaded through the bearings. During the threading-in process, the bearing protection rings 252a, 252b are also threaded in. The two pivot levers 226a, 226b make contact with the axle piece 231.1 of the transmission lever 231 in the region of the respective face region-side toothings, and, when correctly aligned with respect to one another, can be coupled rotationally conjointly to one another, such that the pivot levers 226a, 226b and the transmission lever are connected rotationally conjointly to one another. The orientation of the individual parts relative to one another can be facilitated by virtue of an axle being pushed through the two pivot levers 226a, 226b and the eyelet of the spring/damper element 140. The axle may have a bevel which interacts with a corresponding bevel in the elements to be fastened to one another, such that the elements are oriented relative to one another with the angular relationship required for the assembly process. The connection between the pivot levers 226a, 226b is secured axially by way of the quick-action clamping means 254. The spring/damper element 140 is then pushed into its operating position and subsequently fastened, by way of its lower end, directly to the frame, to the cover or by way of a fastening element. After the connection of the pivot levers 226a, 226b to the corresponding centers of rotation of the rocker arm assembly, it is now possible for forces to be transmitted from the rocker arm assembly via the pivot levers 226a, 226b and the transmission lever 231 to the spring/damper element 140.

By way of the quick-action clamping means 254, the two pivot levers 226a, 226b can be temporarily released from the transmission lever 231. In the released state, the relative angle between the pivot levers 226a, 226b on the one hand and the transmission lever 231 on the other hand can be adjusted and can be fixed again by virtue of the quick-action clamping means 254 being tightened. It is possible for the geometry of the rear-wheel suspension arrangement to be adapted in this way. Because the sector-shaped webs and apertures remain in engagement even in the released state of the face-side toothings, the maximum adjustment range is restricted to approximately 4° as mentioned above.

Figure 5A:
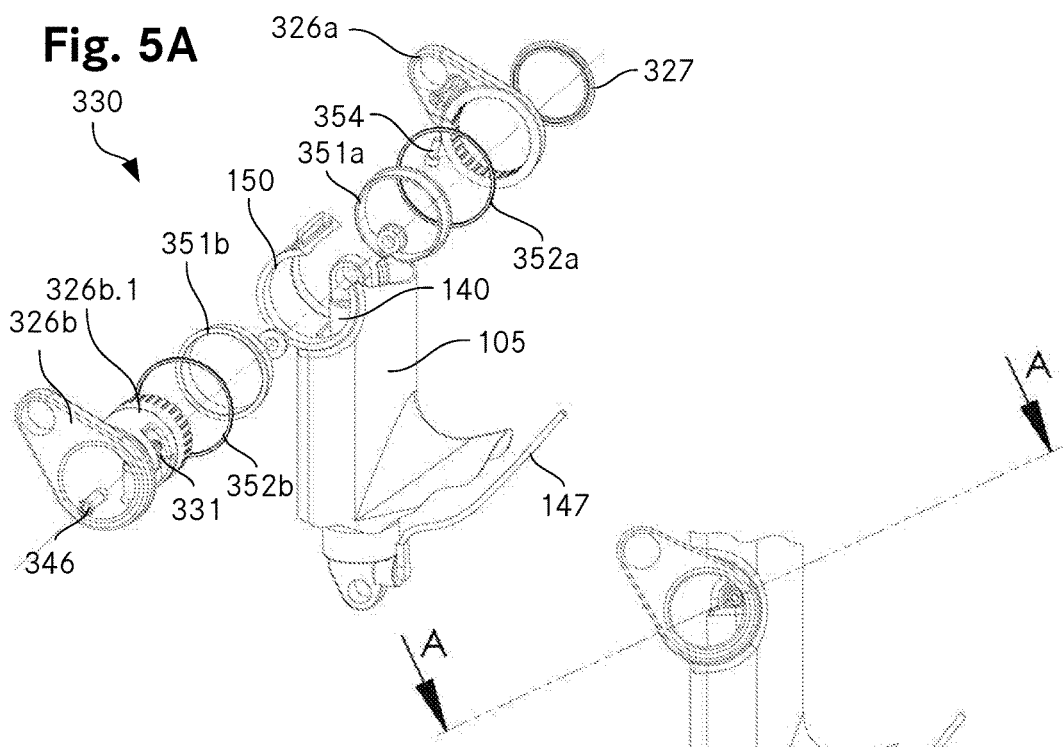
FIGS. 5A-E show a third variant of the transmission mechanism of the first embodiment.
Figure 5B:
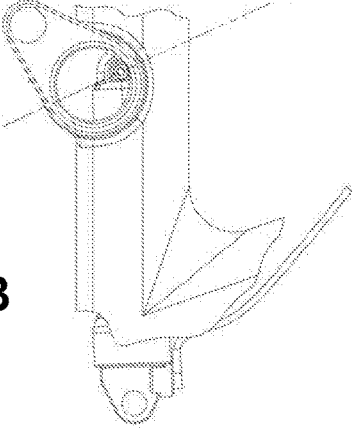
Figures 5D, 5E:
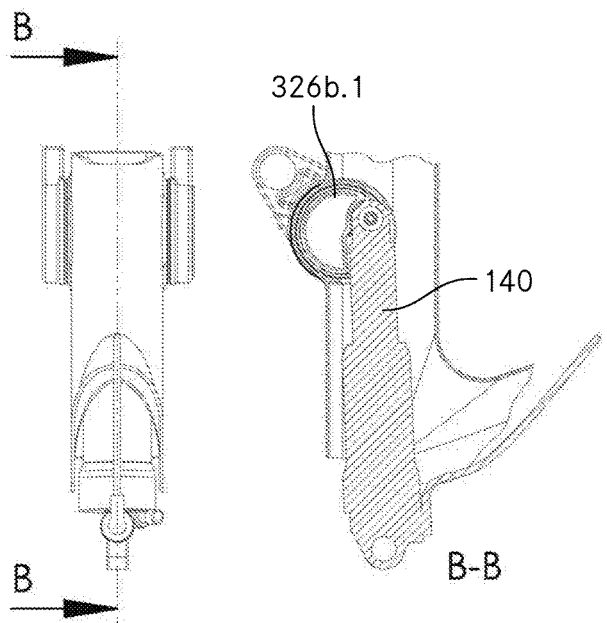
Figure 5C:
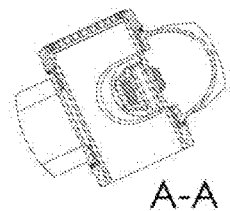

FIGS. 5A-E show a third variant of a transmission mechanism 330 of the first embodiment. FIG. 5A is an exploded illustration, FIG. 5B is a side view, and FIG. 5C shows a cross section along the plane A-A indicated in FIG. 5B. FIG. 5D shows a front view, and FIG. 5E shows a cross section along the plane B-B indicated in FIG. 5D.

As already shown in conjunction with FIG. 2, the transmission mechanism 330 is accommodated in the seat tube 105. Said transmission mechanism is coupled to two pivot levers 326a, 326b. These are mounted in an axially oriented opening 150 on both sides in the seat tube 105, and in the installed state are connected rotationally conjointly to a bearing 331 which is positioned eccentrically with respect to a rotary axis of the pivot levers 326a, 326b. In the installed state, the bearing 331 is coupled rotatably to the free upper end of the spring/damper element 140. The mouths of the axial opening 150 on both sides are in this case connected by a tube-like structure which has merely a cutout for the leadthrough of the spring/damper element 140. The stability of the seat tube 105 can be increased in this way. The lower end of the spring/damper element 140 is again—as described in conjunction with FIG. 2 or FIG. 3—mechanically connected to the down tube of the bicycle.

The individual components of the transmission mechanism 330 will be described in more detail below. One of the pivot levers 326b comprises, on its front end which in the installed state engages into the opening 150, a cylindrical axle piece 326b.1. Said axle piece comprises, adjacent to its face side, an external toothing with radial ribs. An internal thread is formed on the inside in the same region. Behind said internal thread there is formed a sector-shaped recess. Openings which are aligned with one another are cut out of the radial walls of said recess.

The other pivot lever 326a comprises an opening with an internal toothing, the geometry of which is matched to the external toothing of the axle piece 326b.1 of the other pivot lever 326b.

The opening 150 in the frame tube 105 has pressed into it, at both sides, a plain bearing 351a, 351b; such pressed-in bearings are advantageous in conjunction with carbon frames. Plain bearings furthermore represent a good choice for the relatively large bearing diameter. Suitable bearings are basically known from the region of the pedal-crank bearing.

In the installed state, the axle piece 326b.1 of one pivot lever 326b is mounted in the plain bearings 351a, 351b. Between the pivot levers 326a, 326b and the face side of the plain bearings 351a, 351b there are arranged spacer rings 352a, 352b. The two pivot levers 326a, 326b are mounted rotationally conjointly on one another by way of their face region-side toothings. A clamping ring 327 with an external thread and with a flange is screwed onto the internal thread of the axially oppositely situated pivot lever 326b, and is supported by way of its flange on the adjacent pivot lever 326a. By way of the screwing-on action, the axial play between the two pivot levers 326a, 326b can be eliminated. The connection between the pivot levers 326a, 326b is finally secured by way of a clamping screw 354.

The upper end of the spring/damper element 140 is rotatably fastened to the eccentric bearing 331 of one pivot lever 326b. For this purpose, a securing bolt 346 is passed through the two openings of the radial walls and, between these, through a corresponding eyelet of the spring/damper element, and is subsequently secured by known means.

The spring/damper element 140 is in turn a commercially available component with a linear pneumatic spring and an oil damping arrangement. In the region of the lower end, there is connected a Bowden cable 147, by way of which the damping characteristic of the spring/damper element 140 can be adjusted in a manner known per se. The adjustment may also be performed not by way of a Bowden cable but by way of a hydraulic or electrical line or a wireless signal connection.

The transmission mechanism 330 is installed on the frame as follows: firstly, the plain bearings 351a, 351b are pressed into the opening 150 of the seat tube 105 on both sides.

Subsequently, one pivot lever 326b is threaded by way of its axle piece 326b.1 through the corresponding bearing. During the threading-in process, the spacer rings 352a, 352b are also jointly threaded in. Said spacer rings compensate installation-induced tolerances. When the axle piece 326b.1 passes through the corresponding bearing on the opposite side, the other pivot lever 326a is pushed on, the clamping ring 327 is tightened, and the connection between the pivot levers 326a, 326b is finally secured by way of the clamping screw 354.

The spring/damper element 140 is then inserted into the seat tube 105 from below and is fixedly held. The two pivot levers 326a, 326b are rotated about their axis such that the openings of the eccentric bearing 331 are aligned with the eyelet of the spring/damper element 140, and subsequently, the securing bolt 346 can be inserted. This is readily possible because the axis of the eccentric bearing 331 is still situated within the cylindrical space spanned by the opening 150; the cross section of the opening is selected correspondingly. Subsequently, the spring/damper element 140 is, at its lower end, fastened directly to the frame, to the cover or by way of a fastening element. After the connection of the pivot levers 326a, 326b to the corresponding centers of rotation of the rocker arm assembly, it is now possible for forces to be transmitted from the rocker arm assembly via the pivot levers 326a, 326b and the eccentric bearing 331 to the spring/damper element 140.

Owing to the recess, which is completely surrounded by walls, in the pivot lever 326b, the spring/damper element 140 is, in the installed state, protected against dirt that may ingress through the opening 150 into the interior of the pivot lever 326b. The large opening cross section of, for example, 110 mm permits simple installation and dismounting of the spring/damper element, wherein, in particular, additional openings in the frame are also omitted. However, use may also be made of openings of relatively small cross section of, for example, 50-80 mm, which have less of an effect on the structure of the corresponding frame tube.

FIGS. 6A-D show a fourth variant of a transmission mechanism 430 of the first embodiment. FIG. 6A is an exploded illustration, FIG. 6B is a side view, and FIG. 6C shows a front view. FIG. 6D shows a cross section along the plane A-A indicated in FIG. 6C.

As already shown in conjunction with FIG. 2, the transmission mechanism 430 is accommodated in the seat tube 105. Said transmission mechanism is coupled to two pivot levers 426a, 426b. These are mounted in an axially oriented opening 150 on both sides in the seat tube 105. A transmission lever 431 is mounted in one of the pivot levers 426b and, in the installed state, is coupled rotatably to the free upper end of the spring/damper element 140. The lower end of the spring/damper element 140 is again—as described in conjunction with FIG. 2 or FIG. 3—mechanically connected to the down tube of the bicycle.

The individual components of the transmission mechanism 430 will be described in more detail below. One of the pivot levers 426b comprises, on its front end which in the installed state engages into the opening 150, a cylindrical axle piece 426b.1. Said axle piece comprises, adjacent to its face side, an external toothing with radial ribs. An internal thread is formed on the inside in the same region. Behind said internal thread there is formed a sector-shaped recess. Two sets of two openings which are aligned with one another pairwise are cut out of the radial walls of said recess. In the installed state, the recess receives the rear end of the transmission lever 431. Here, a central opening 431.1 in the transmission lever is aligned with one of the openings, provided in the radial walls, which is arranged eccentrically with respect to the rotary axis of the pivot lever 426b. The transmission lever 431 is held rotatably in the recess by way of a securing bolt 448 inserted into the opening 431.1, wherein the possible angle of rotation is restricted to approximately 4° by the walls of the recess.

The transmission lever 431 has, close to its rear end which is situated opposite the engagement point of the spring/damper element 140, an elongated hole 431.2, the extent of which is greater in the direction of the further opening 431.1 than in a direction perpendicular thereto. A control element 449 with an eccentric section interacts with the elongated hole 431.2. The control element 449 is mounted by way of a coaxial section in a circular opening in the transmission lever 431; in the installed state, the eccentric section of the control element 449 projects into the elongated hole 431.2 of the transmission lever 431. Depending on the position of the control element 449, the transmission lever 431 interacts with a different abutment surface of the pivot lever 426b, that is to say has a different relative angular position. The geometry of the eccentric section of the control element 449 and of the elongated hole 431.2 is selected such that the control element 449 is, during the movement into each of the two end positions, moved beyond a dead center, and in the end position, bears firmly against a respective end of the elongated hole 431.2, such that, without further means, the end position is arrested and can be varied only by way of a force exerted on the control element 449 from the outside. The control element 449 has, on the outer side, a lever oriented perpendicular to the axis. Said lever firstly acts as an operating element and secondly displays the set angular position (lever directed upward: uphill travel; lever directed downward: downhill travel).

The other pivot lever 426a comprises an opening with an internal toothing, the geometry of which is matched to the external toothing of the axle piece 426b.1 of the other pivot lever 426b.

The opening 150 in the frame tube 105 has pressed into it, at both sides, a plain bearing 451a, 451b; such pressed-in bearings are advantageous in conjunction with carbon frames. Suitable bearings are basically known from the region of the pedal-crank bearings.

In the installed state, the axle piece 426b.1 of one pivot lever 426b is mounted in the plain bearings 451a, 451b. Between the pivot levers 426a, 426b and the face side of the plain bearings 451a, 451b there are arranged spacer rings 452a, 452b. A clamping ring 427 with an external thread and with a flange is screwed onto the internal thread of the axially oppositely situated pivot lever 426b, and is supported by way of its flange on the adjacent pivot lever 426a. By way of the screwing-on action, the axial play between the two pivot levers 426 can be eliminated.

The two pivot levers 426a, 426b are mounted rotationally conjointly on one another by way of their face region-side toothings; the connection is secured by way of a clamping screw 454.

The upper end of the spring/damper element 140 is fastened rotatably to the free end of the transmission lever 431. For this purpose, a securing bolt 446 is passed through two openings, which are aligned with one another, in the transmission lever 431 and, between these, through a corresponding eyelet of the spring/damper element, and is subsequently secured by known means.

The spring/damper element 140 is in turn a commercially available component with a linear pneumatic spring and an oil damping arrangement. In the region of the lower end, there is connected a Bowden cable 147, by way of which the damping characteristic of the spring/damper element 140 can be adjusted in a manner known per se. The adjustment may also be performed not by way of a Bowden cable but by way of a hydraulic or electrical line or a wireless signal connection.

The transmission mechanism 430 is installed on the frame as follows: firstly, the plain bearings 451a, 451b are pressed into the opening 150 of the seat tube 105 on both sides.

Subsequently, one pivot lever 426b is threaded by way of its axle piece 426b.1 through the corresponding bearing.

During the threading-in process, the spacer ring is also jointly threaded in. When the axle piece 426b.1 passes through the corresponding bearing on the opposite side, the other pivot lever 426a is pushed on, and the clamping ring 427 is tightened and is finally secured by way of the clamping screw 454.

The spring/damper element 140, together with the transmission lever 431 attached thereto, is then inserted into the seat tube 105 from below. The two pivots levers 426a, 426b which are fastened to one another are rotated about their axis by approximately 90° such that the recess in one pivot lever 426b can receive the transmission lever 431. The transmission lever 431 is then fastened to the pivot lever 426b by way of the insertion of the securing bolt 448. This is readily possible because the corresponding axis is still situated within the cylindrical space spanned by the opening 150; the cross section of the opening is selected correspondingly. Subsequently, the main part 449b of the control element is inserted into the pivot lever 426b, and the counterpart 449a is connected, from the opposite side, to the main part 449b. For this purpose, both elements have a face-side toothing, and the securing of the two elements against one another is realized by way of an axial screw 449c. Finally, the spring/damper element 140 is, at its lower end, fastened directly to the frame, to the cover or by way of a fastening element. It is now possible for forces to be transmitted from the rocker arm assembly via the pivot levers 426a, 426b and the transmission lever 431 to the spring/damper element 140.

Alternatively, the transmission lever 431 is firstly inserted through the lower frame opening and the seat tube 105 and fastened to the pivot lever 426b, with the spring/damper element 140 then subsequently being connected to the transmission lever 431. For this purpose, the securing bolt 446 can be inserted through a correspondingly positioned opening in the seat tube 105 and tightened. The opening is subsequently closed off in weather-tight fashion by way of a closure cap.

Owing to the recess, which is completely surrounded by walls, in the pivot lever 426b, the spring/damper element 140 is, in the installed state, protected against dirt that may ingress through the opening 150 into the interior of the pivot lever 426b. The large opening cross section of, for example, 80 mm permits simple installation and dismounting of the spring/damper element, wherein, in particular, additional openings in the frame are also omitted.

Figure 7A:
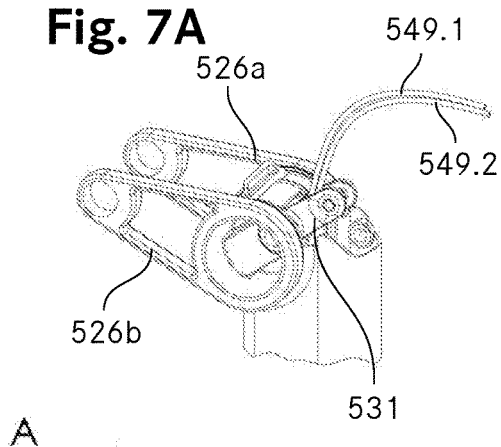
FIGS. 7A-F show a fifth variant of a transmission mechanism of the first embodiment.
Figure 7B:
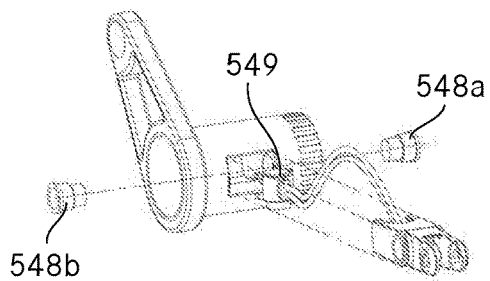
Figures 7C, 7D:
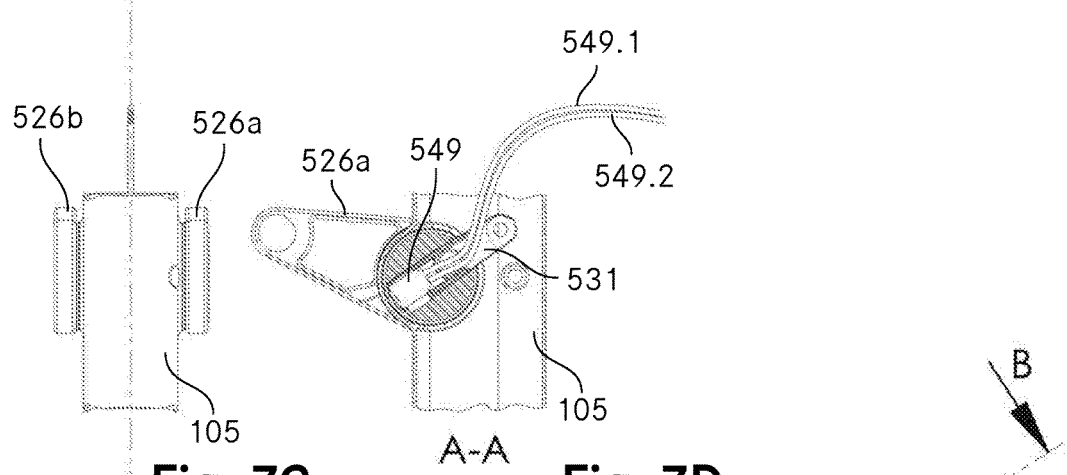
Figure 7E:
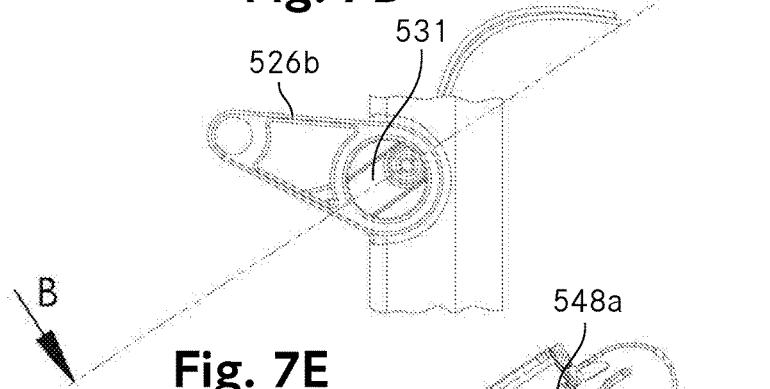
Figure 7F:
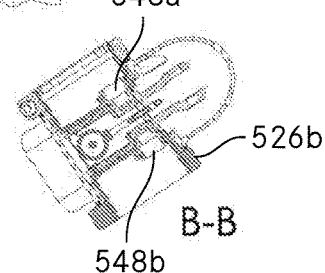

FIGS. 7A-F show a fifth variant of a transmission mechanism 530 of the first embodiment. FIGS. 7A and 7B show oblique views, and FIG. 7C shows a front view. FIG. 7D shows a cross section along the plane A-A indicated in FIG. 7C. FIG. 7E is a side view, and FIG. 7F shows a cross section along the plane B-B indicated in FIG. 7E.

The fourth variant corresponds largely to the third variant described in conjunction with FIG. 6, wherein, however, a remote actuation of the angle adjustment between pivot lever 526a, 526b and transmission lever 531 is made possible. Below, only the differences in relation to the third variant will be discussed.

The transmission lever 531 is again mounted in a recess of one of the pivot levers 526b. Instead of an eccentric control element, however, a bidirectionally actuable hydraulic cylinder 549 is provided. The corresponding piston can, by way of two hydraulic lines 549.1, 549.2, be moved into an upper position and into a lower position. The lower position can be clearly seen in FIG. 7D. Depending on the piston position, the transmission lever 531 is situated in a different angular position relative to the pivot levers 526a, 526b; the angle difference is again approximately 4°. To permit unimpeded passage of the hydraulic lines 549.1, 549.2, the transmission lever 531 is, by contrast to the third variant, secured to the pivot lever 526b on both sides by way of in each case one dedicated securing bolt 548a, 548b.

Figure 8A:
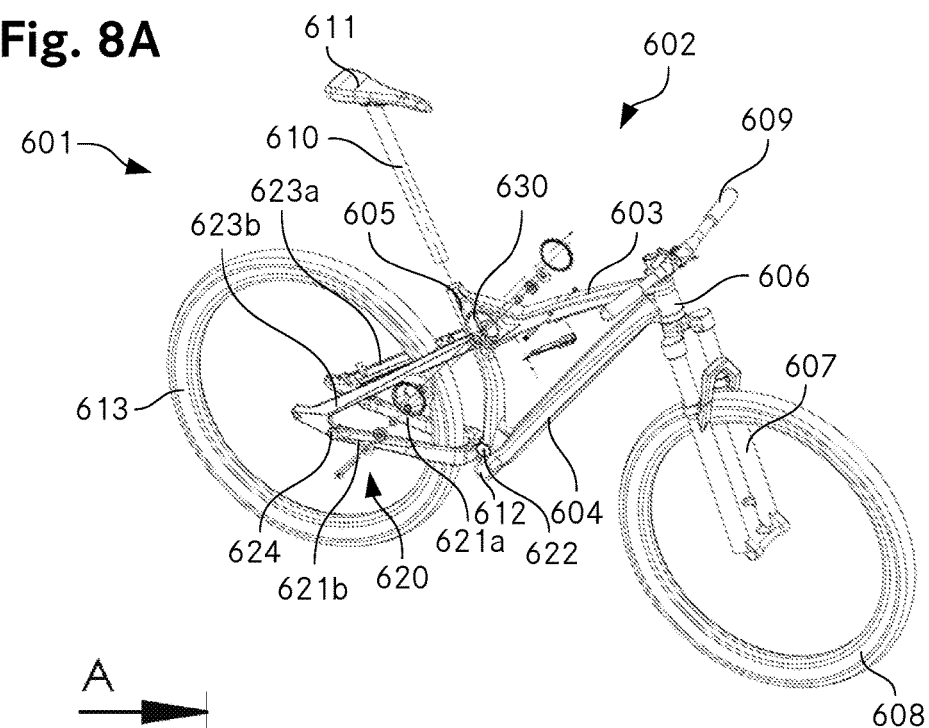
Figure 8B:
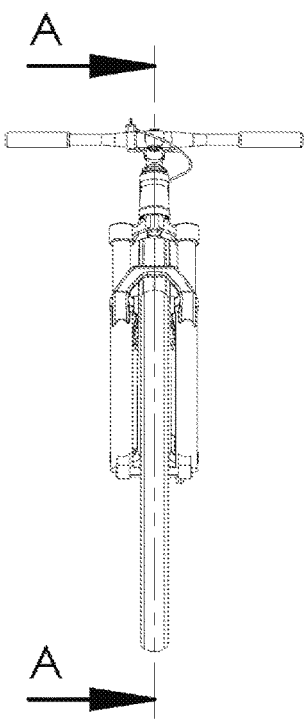
Figure 8C:
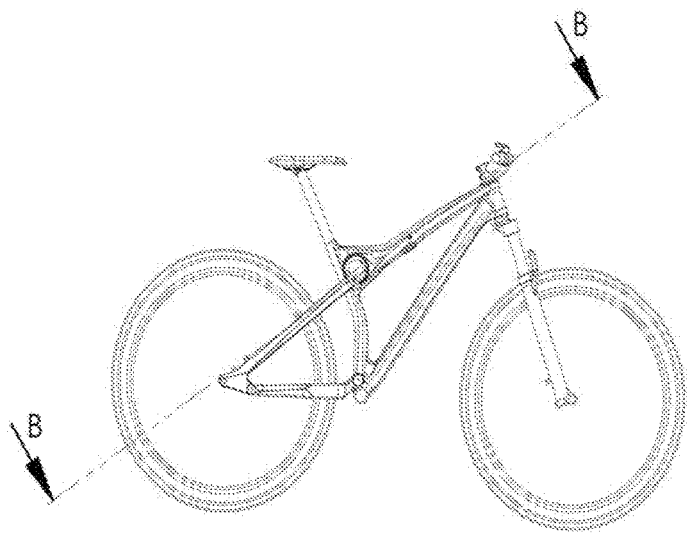

FIGS. 8A-8G show a second embodiment of a two-wheeled vehicle according to the invention. FIG. 8A shows an oblique view, FIG. 8B shows a front view, and FIG. 8C shows a side view. FIG. 8D shows a section along the vertical plane A-A indicated in FIG. 8B. Figure BE shows a section along the plane B-B which is indicated in FIG. 8C and which runs obliquely through the transmission mechanism. FIGS. 8F and 8G show a detail view of the bearing point for the swing arm assembly with the transmission mechanism according to the invention.

The bicycle 601 as per the second embodiment comprises, in a manner known per se, a frame 602 with a top tube 603, a down tube 604, and a seat tube 605, which form a triangular frame. Arranged on the front end of the top tube 603 and of the down tube 604 is the steering tube 606, in which the front-wheel fork 607 is mounted so as to be rotatable about the steering axis. The front-wheel fork 607 bears the front wheel 608, and is connected rotationally conjointly at its upper end to the handlebar 609.

A saddle support 610 with a saddle 611 is inserted into the seat tube 605 and secured by way of a conventional clamping device. Further components, such as brakes, gear mechanism etc., are likewise provided and are designed and arranged in a manner known per se, but have been omitted from the figures in order to provide a better overview.

The rotary axis of the rear wheel 613 is mounted on a swing arm assembly 620. Said swing arm assembly comprises, at both sides, in each case one lower swing arm 621a, 621b, which lower swing arms are mounted so as to be pivotable about an axial rotary axis 622 directly above the pedal-crank bearing 612, and which lower swing arms extend rearward from said rotary axis 622 substantially in a horizontal direction. In turn, upper swing arms 623a, 623b are mounted, pivotably about a rotary axis 624, on the lower swing arms 621a, 621b. Said upper swing arms comprise a rear limb, which extends further rearward from the rotary axis 624 substantially horizontally and which, in the region of its free end, bears the rear-wheel axle, and a front limb, which extends obliquely forward and upward from the rotary axis 624.

Close to their free end, the front limbs of the upper swing arms 623a, 623b are articulated, by way of a further rotary axis 625, on a transmission mechanism 630; this is illustrated in detail in FIGS. 8E-8G. The swing arms 623a, 623b are mounted on the rotary axis 625 by way of ball bearings; in each case one spacer ring is arranged between the ball bearings and the outer surface of the rotary sleeve 670.

The transmission mechanism couples the upper swing arms 623a, 623b to a spring/damper element 640. The spring/damper element 640 is accommodated in a rear region of the top tube 603. An opening 642 in the top tube 603 for the insertion and removal of the spring/damper element is closed off by way of a cover 643 which is likewise fastened to the frame 602. At its front end, said spring/damper element is fastened by way of axial screws 641 to the top tube 603.

The transmission mechanism 630 comprises a plain bearing 651 with two bearing rings 651a, 651b. A rotary sleeve 670 is rotatably mounted in said bearing rings. The rotary sleeve, on one side, has a flange which protrudes outward beyond the bearing, and, on the other side, has an internal thread which can interact with a securing nut 671. The securing nut 671 has radial channels on its inside. After the tightening of the securing nut 671, the connection to the rotary sleeve 670 is secured by way of the insertion and tightening of a control screw 673 that is received in a thread in the rotary sleeve 671 (or by way of a spring pressure pin or a securing pin). The control screw 673 or the pin interacts with the radial channels and prevents an inadvertent release of the securing nut 671.

The rotary sleeve 670 is substantially in the form of a hollow cylinder, but has, proceeding from its circumference, an encircling recess. Said recess reduces the installation space required in a region directly in front of the receiving chamber in the seat tube 605, which is occupied by the saddle support 610. It is thus also necessary for the saddle support 610 to be removed before the installation or dismounting of the rotary sleeve 670. Furthermore, proceeding from the recess mentioned above, the rotary sleeve 670 has an additional recess 670.1 which can receive the front end of the spring/damper element 640. Furthermore, the rotary sleeve 670 has an axial receptacle 670.2 for the rotary axis 625, which receptacle is arranged eccentrically with respect to the rotary axis of the rotary sleeve 670. The rotary axis 625 simultaneously interacts, in its middle section, with the front end of the spring/damper element 640. The eyelet thereof surrounds the rotary axis 625.

In the rotary sleeve 670 there are provided slots 672, which are protected on the weather-exposed side, for generating an air circulation. Further openings are provided in the cover 643. The spring element can thus be cooled efficiently in a simple manner.

It is now possible for forces to be transmitted from the rocker arm assembly via the rotary axis 625 to the spring/damper element 640, wherein the rotary sleeve 670 serves for mounting the rotary axis 625 on the frame 601 and predefines the path of the rotary axis 625 along a circular circumferential segment.

Owing to the recess 670.1, which is completely surrounded by walls, and the receptacle 670.2 for the rotary axis 625, the spring/damper element 640 is, in the installed state, protected against dirt that may ingress through the opening 650 into the interior of the rotary sleeve 670. The large opening cross section of, for example, 110 mm permits simple installation and dismounting of the spring/damper element, wherein in particular, additional openings in the frame are also omitted. However, use may also be made of openings of relatively small cross section of, for example, 50-80 mm, which have less of an effect on the structure of the corresponding frame tube.

In a variant in relation to FIG. 8, the opening with the rotary sleeve is arranged further down in the seat tube, and the spring/damper element is accommodated in the seat tube above the opening. Instead of the securing nut, it is possible for a closure disk with fitting groove to be provided which is fastened by way of the rotary axis 625, and possibly additional fixing screws, to the rotary sleeve. It is not necessary for the axes of the rotary sleeve and of the swing arm assembly to coincide, or for the axes of the rotary sleeve and of the spring/damper element to coincide. Furthermore, ball bearings may be used instead of the plain bearings.

FIGS. 9A-F schematically show oblique views of different configurations of the transmission mechanism according to the invention. Arrows are used in each case to indicate the action points of the force introduced by the swing arm assembly and the transmission point to the spring/damper element.

Figure 9A:
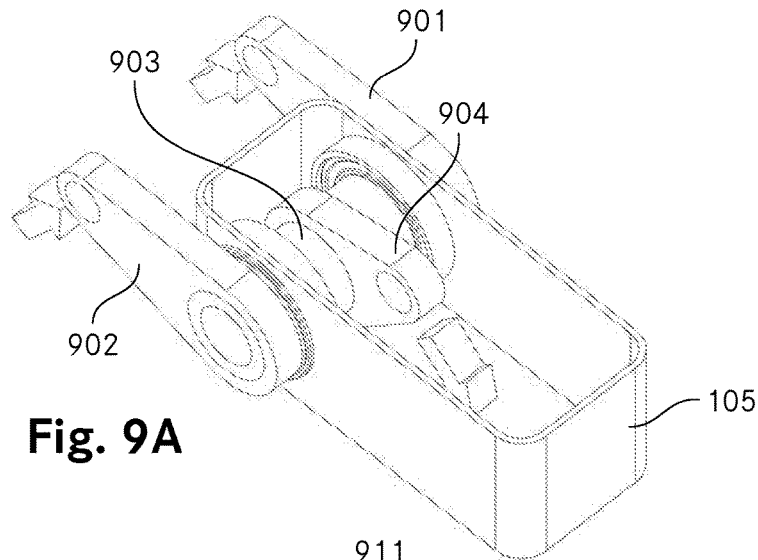
FIGS. 9A-F show oblique views of different configurations of the transmission mechanism according to the invention.

FIG. 9A shows a configuration in which the force from the swing arm assembly is transmitted to two pivot levers 901, 902, from these to a rotary axis 903, and via a transmission lever 904 to the spring/damper element. Both the pivot levers 901, 902 and also the transmission lever 904 are, in the installed state, connected rotationally conjointly to the rotary axis 903. The angle between the two pivot levers 901, 902, on the one hand, and the transmission lever 904, on the other hand, is approximately 150°, and the force is diverted substantially downward, such that the corresponding configuration is suitable in particular for installation in the seat tube 105. Specific embodiments with this configuration are shown for example in FIGS. 3 and 4.

Figure 9B:
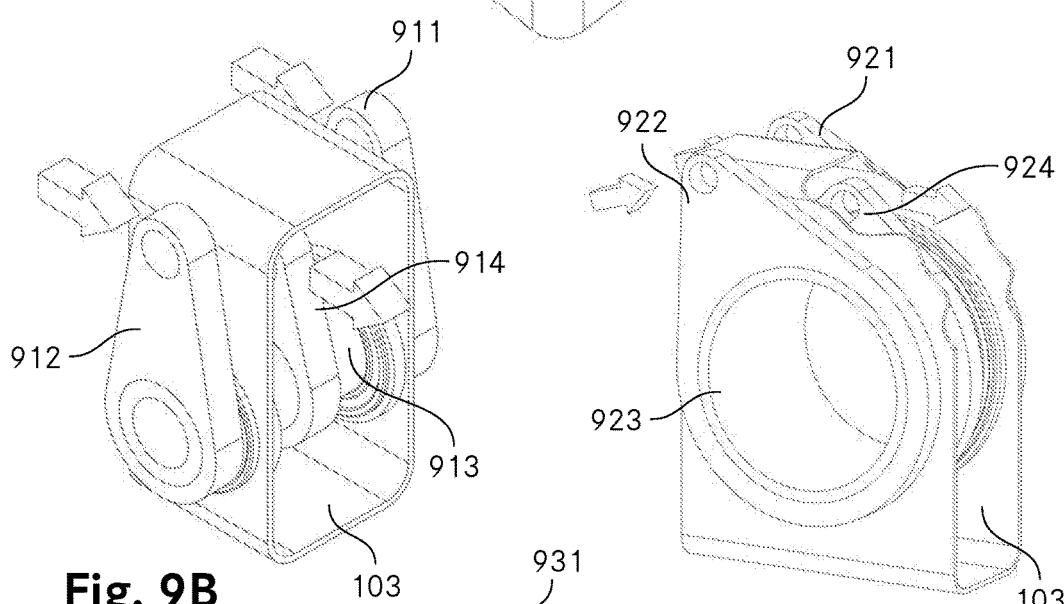

FIG. 9B shows a further configuration, in which the force is transmitted from the swing arm assembly to two pivot levers 911, 912, from these to a rotary axis 913, and via a transmission lever 914 to the spring/damper element. Both the pivot levers 911, 912 and also the transmission lever 914 are, in the installed state, connected rotationally conjointly to the rotary axis 913. The two pivot levers 901, 902 and the transmission lever 904 are arranged substantially parallel, and the force is diverted substantially forward, such that the corresponding configuration is suitable in particular for installation in the top tube 103.

Figure 9C:
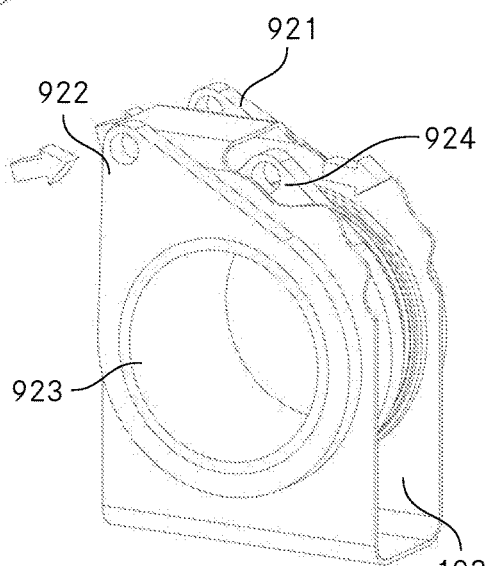

FIG. 9C shows a further configuration, which substantially corresponds to that of FIG. 9B. The force from the swing arm assembly is transmitted to two pivot levers 921, 922, from these to a rotary sleeve 923, and via a transmission lever 924 to the spring/damper element. Here, the rotary axis is thus in the form of a rotary sleeve 923 which is received in a bearing of relatively large diameter. Both the pivot levers 921, 922 and the transmission lever 924 are, in the installed state, connected rotationally conjointly to the rotary sleeve 923. The angle between the two pivot levers 921, 922, on the one hand, and the transmission lever 924, on the other hand, is approximately 30°, and the force is diverted substantially forward, such that this configuration, too, is suitable in particular for installation in the top tube 103. Specific embodiments with this configuration are shown for example in FIGS. 6 and 7, wherein there, the angle between the pivot levers and the transmission lever is adjustable.

Figure 9D:
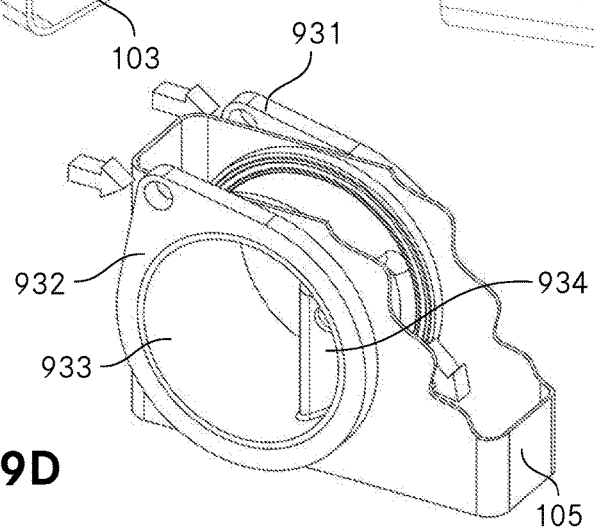

FIG. 9D shows a further configuration. As in FIG. 9C, the force from the swing arm assembly is transmitted to two pivot levers 931, 932, and from these to a rotary sleeve 933. Instead of a transmission lever, it is however now the case that the rotary sleeve 933 has an eccentric bearing point 934, which in this case is formed in a recess of the rotary sleeve 933. The recess receives the front end of the spring/damper element. The pivot levers 931, 932 are, in the installed state, connected rotationally conjointly to the rotary sleeve 933. The angle between the two pivot levers 931, 932, on the one hand, and the eccentric bearing point 934, on the other hand, is approximately 100°, and the force is diverted obliquely forward and downward, such that this configuration, too, is suitable in particular for installation in a correspondingly shaped seat tube 105. A specific embodiment with this configuration is shown for example in FIG. 5.

Figure 9E:
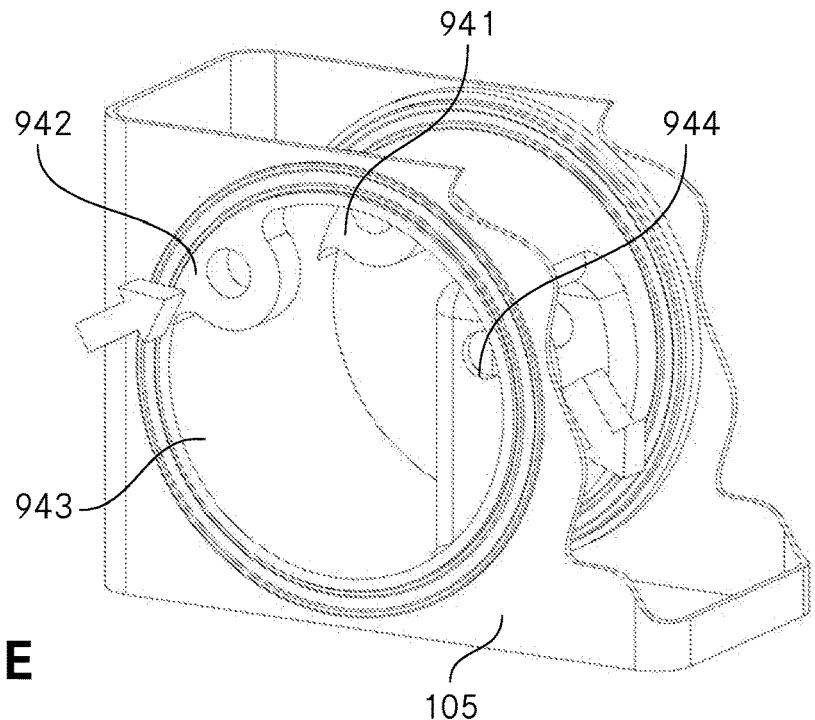

FIG. 9E shows a further configuration. By contrast to FIG. 9D, the force from the swing arm assembly is transmitted to the rotary sleeve 943 not via pivot levers but via eccentric bearing points 941, 942 arranged on the rotary sleeve 943. As in FIG. 9D, it is also the case here that the rotary sleeve 943 has a further eccentric bearing point 944, which in this case, too, is formed in a recess of the rotary sleeve 943. The recess receives the front end of the spring/damper element. The angle between the first eccentric bearing points 941, 942, on the one hand, and the eccentric bearing point 944, on the other hand, is in turn approximately 100°, and the force is diverted obliquely forward and downward, such that this configuration, too, is suitable in particular for installation in a correspondingly shaped seat tube 105.

Figure 9F:
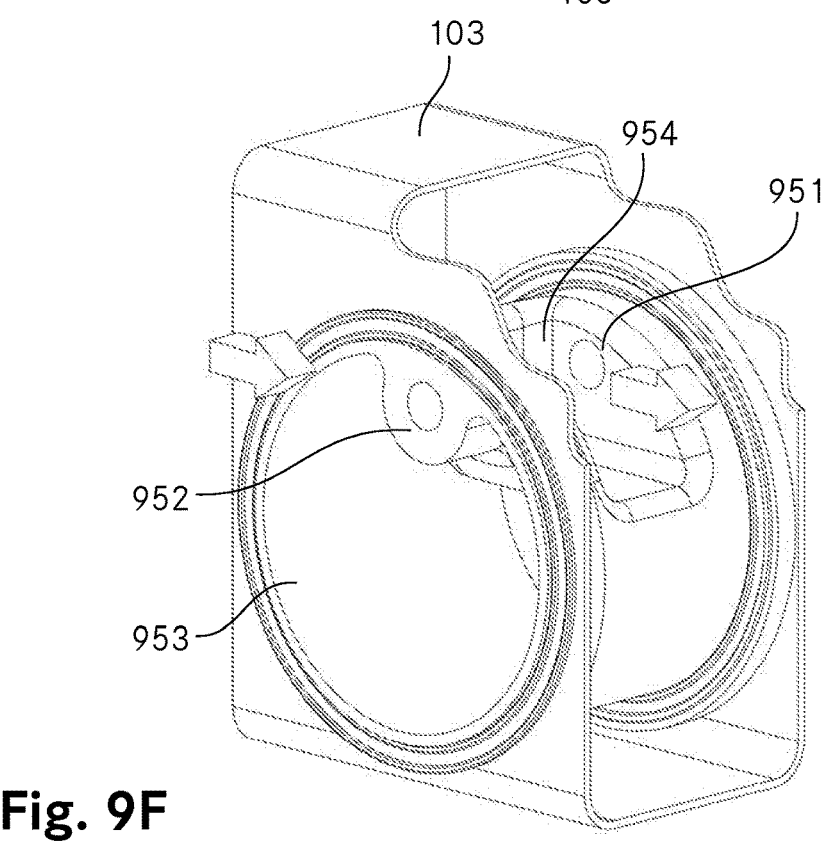

Finally, FIG. 9F shows a configuration in which the eccentric bearing points 951, 952 for the action of the swing arm assembly and the bearing point 954 for the spring/damper element coincide. The force is thus transmitted substantially in the same direction, such that this configuration is suitable in particular for installation in a top tube 103. A specific embodiment with this configuration is shown for example in FIG. 8.

Figure 10A:
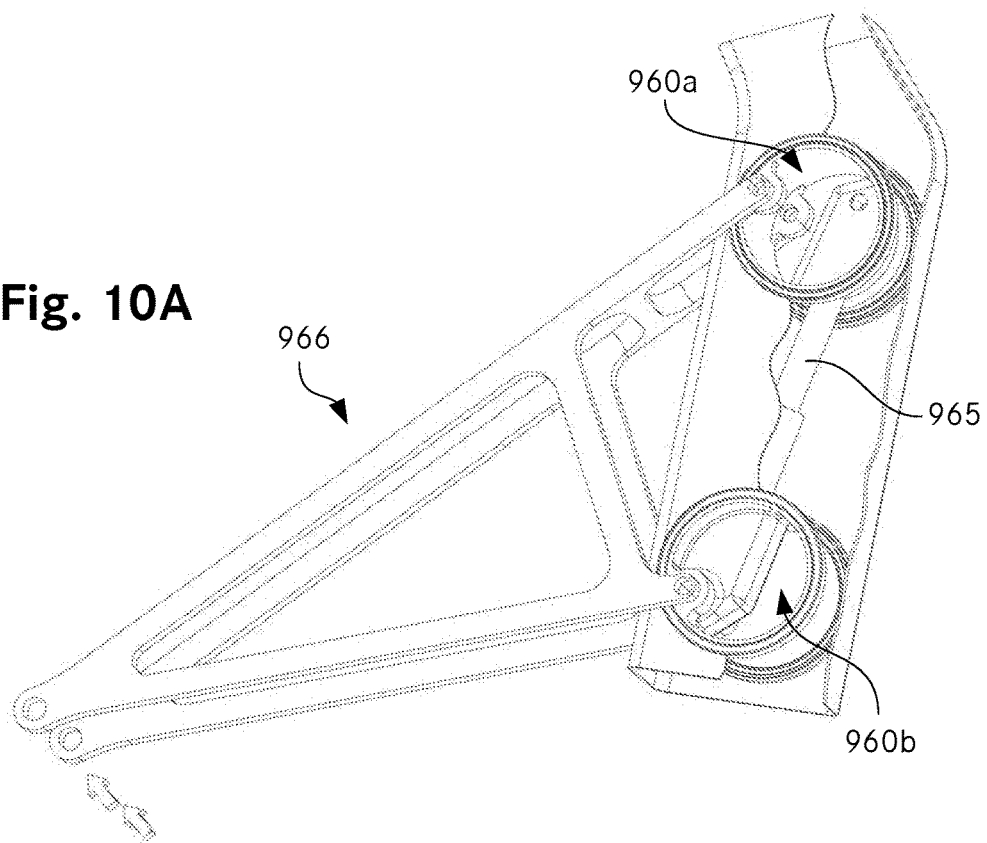
FIGS. 10A, B show oblique views of two further configurations of the transmission mechanism according to the invention.
Figure 10B:
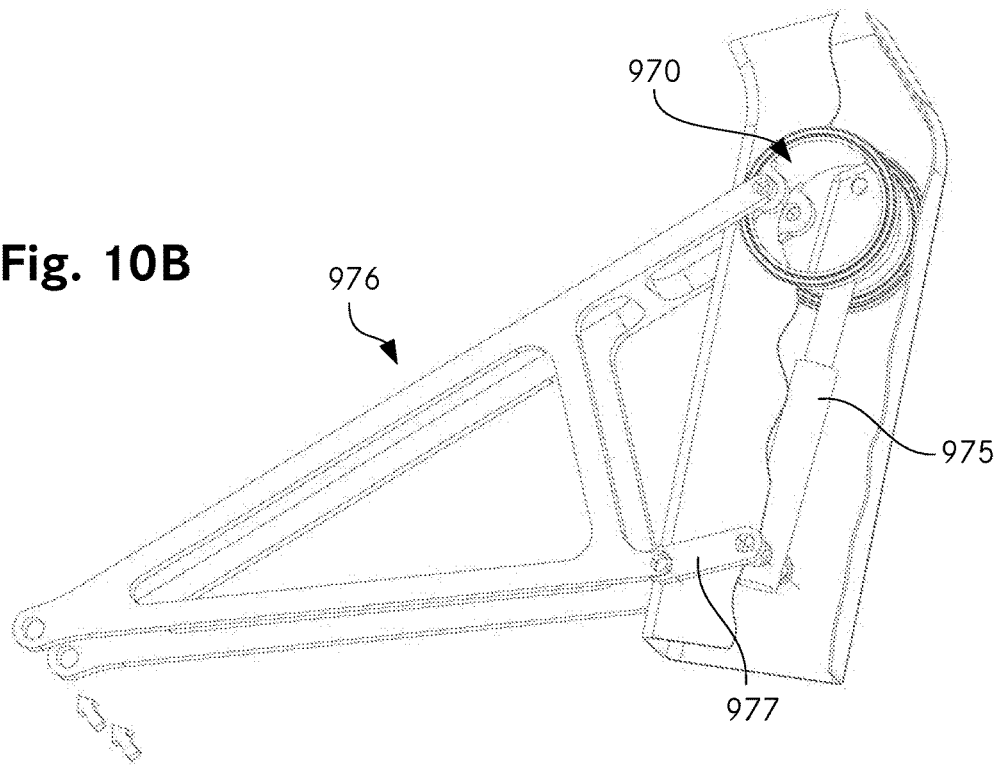

FIGS. 10A and 10B schematically show oblique views of two configurations of the transmission mechanism according to the invention for the transmission of the forces, indicated by arrows, of a swing arm assembly with fixed rear triangular frame to the spring/damper element.

FIG. 10A shows a variant in which the spring/damper element 965 is articulated, by way of both ends, at spaced-apart engagement points of the swing arm assembly 966 (cf. configurations as per FIGS. 1A and 1T). A transmission mechanism 960a, 960b according to the invention is provided at both points; in FIG. 10A, the upper transmission mechanism 960a has the configuration as per FIG. 9E, and the lower transmission mechanism 960b has the configuration as per FIG. 9F. Depending on requirements, it is however also possible for other configurations to be used.

FIG. 10B shows a further variant, in which the spring/damper element 975 is articulated only by way of the upper end at a first engagement point of the swing arm assembly 976. The lower end is positioned fixedly on the frame (cf. configurations as per FIGS. 1D, 1O, 1Q, 1S). The second engagement point of the swing arm assembly is articulated on the frame via a lever 977. Correspondingly, a transmission mechanism 970 according to the invention is provided only at the upper point, said transmission mechanism in this case again having a configuration as per FIG. 9E. Depending on requirements, it is however also possible for other configurations to be used.

FIG. 11A shows an oblique view of a third embodiment of a two-wheeled vehicle according to the invention. The figure shows only the region of the rear-wheel swing arm and of the fastening thereof. FIGS. 11B and 11C show a partially sectional view in positions of full spring compression and of full spring extension.

The bicycle 101 again comprises a frame 702 with a top tube 703, a down tube 704, and a seat tube 705, which form a triangular frame. Arranged on the front end of the top tube 703 and of the down tube 704 is the steering tube (not visible) in which the front-wheel fork is mounted so as to be rotatable about the steering axis. The front-wheel fork bears the front wheel, and is connected rotationally conjointly at its upper end to the handlebar.

A saddle support with a saddle is inserted into the seat tube 705 and secured by way of a conventional clamping device (not illustrated). Further components, such as brakes, gear mechanism etc., are likewise provided and are designed and arranged in a manner known per se, but have been omitted from the figures in order to provide a better overview.

The rotary axis of the rear wheel is mounted on a swing arm assembly 720. Said swing arm assembly comprises, at both sides, in each case one lower swing arm 721a, 721b, which lower swing arms are mounted so as to be pivotable about an axial rotary axis 722 directly above the pedal-crank bearing 712, and which lower swing arms extend rearward from said rotary axis 722 substantially in a horizontal direction. Upper swing arms 723a, 723b are formed integrally with the lower swing arms 721a, 721b. Said upper swing arms extend obliquely forward and upward from a bearing point of the rear-wheel axle.

Close to their free end, the front limbs of the upper swing arms 723a, 723b are articulated, by way of a further rotary axis 725, on a transmission mechanism 730. The swing arms 723a, 723b are mounted on the rotary axis 725 by way of ball bearings. Analogously to the embodiment presented above in conjunction with FIG. 8, the rotary axis 725 is arranged on a rotary sleeve 770. Said rotary sleeve is—by contrast to the embodiment of FIG. 8—mounted in the seat tube 705 by way of a ball bearing in the opening.

The transmission mechanism couples the upper swing arms 723a, 723b to a spring/damper element 740. The spring/damper element 740 is accommodated in the seat tube 705 and extends downward from the transmission mechanism 730. Said spring/damper element is formed by a leaf spring which, by way of its upper end, is mounted rotatably on the rotary sleeve 770. An opening 742 in the seat tube 705 for the insertion and removal of the spring/damper element 740 is closed off by way of a cover 743, which is likewise fastened to the frame 702. At its lower end, the leaf spring is screwed to the seat tube 705.

The leaf spring that forms the spring/damper element is composed of a suitable material (carbon, steel, fiberglass, plastic composite material with natural fibers, or the like) and has an integrated damping means. The latter is in the form of a core which is entirely or partially enclosed by the leaf spring itself. Alternatively, the damping means may also be arranged laterally on the leaf spring or on the front and/or rear side of the leaf spring. The damping material is in particular a suitable technical plastic such as elastomer characteristics such as butyl rubber (IIR) or other rubber materials.

In the state of maximum spring compression, as illustrated in FIG. 11C, the middle section of the leaf spring bears against the inner side of the seat tube 705. A stop damping means 745—again composed of a suitable damping material—is applied to the inner side of the seat tube 705 at the contact point.

Numerous variants exist with regard to the third embodiment illustrated in FIG. 11. For example, the stop damping means need not be formed in the manner shown, but rather may also act from one spring end to the other spring end or be provided between the spring and the transmission mechanism or between the transmission mechanism and the respective frame tube. The stop damping means may be fixedly connected to each of the two abovementioned components, such that damping characteristics are realized over the entire spring travel. Instead of the stop damping means, the spring travel may also be defined by way of a travel limitation of the rotational movement of the transmission mechanism. The bearing of the transmission mechanism may furthermore also be formed as a rotary damper. It is also possible for the rotary sleeve with the eccentrically arranged rotary axes, specifically the rotary axis 725 for the mounting of the front limbs of the upper swing arms 723a, 723b of the swing arm assembly 720 and the bearing axis of the spring/damper element 740, to be designed such that, in a desired end position of the spring/damper element 740, said two axes and the rotational axis of the rotary sleeve lie on one line, that is to say the force transmission reaches a dead center position.

Figure 12:
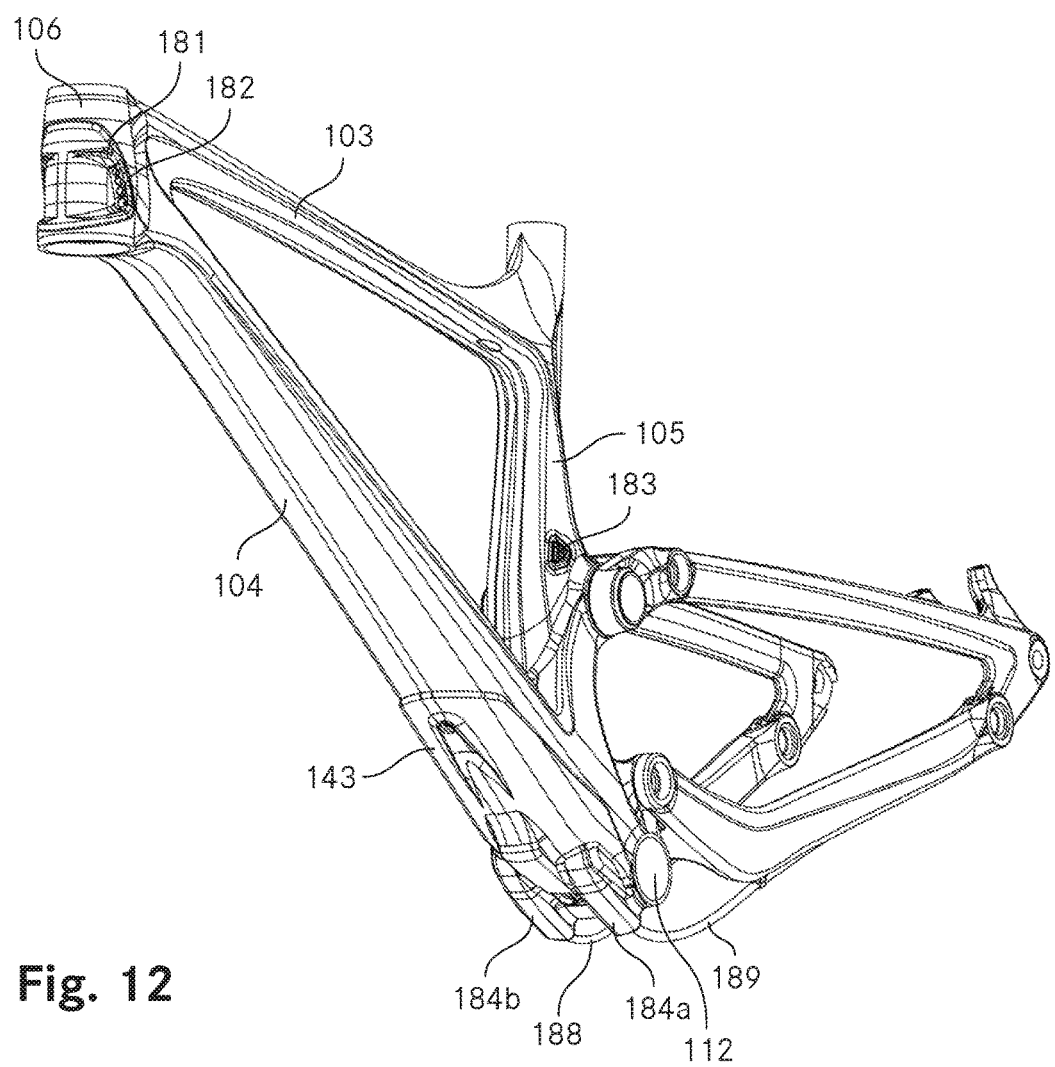
FIG. 12 shows an oblique view for illustrating the guidance of cooling air in a bicycle according to the invention.

FIG. 12 shows an oblique view for illustrating the guidance of cooling air in a two-wheeled vehicle according to the invention. Air inlet openings 181 are arranged in the region of the steering tube 106. Said air inlet openings are exposed to the relative wind, such that during travel, air flows in through the air inlet openings 181 into the top tube 103 and/or into the down tube 104. In the region of the steering tube 106, the openings are relatively well protected against dirt and spray. Aside from the air inlet openings 181, it is possible for circular passage openings 182 for lines (in particular for brakes, gearshifts, for the control of the spring/damper element or for a lowerable saddle support) to be formed in the same region, such that said lines can be guided within the frame tubes. Passage openings 182 that are not used may be utilized as (further) air inlet openings, or may be closed off by way of caps.

Figure 13A:
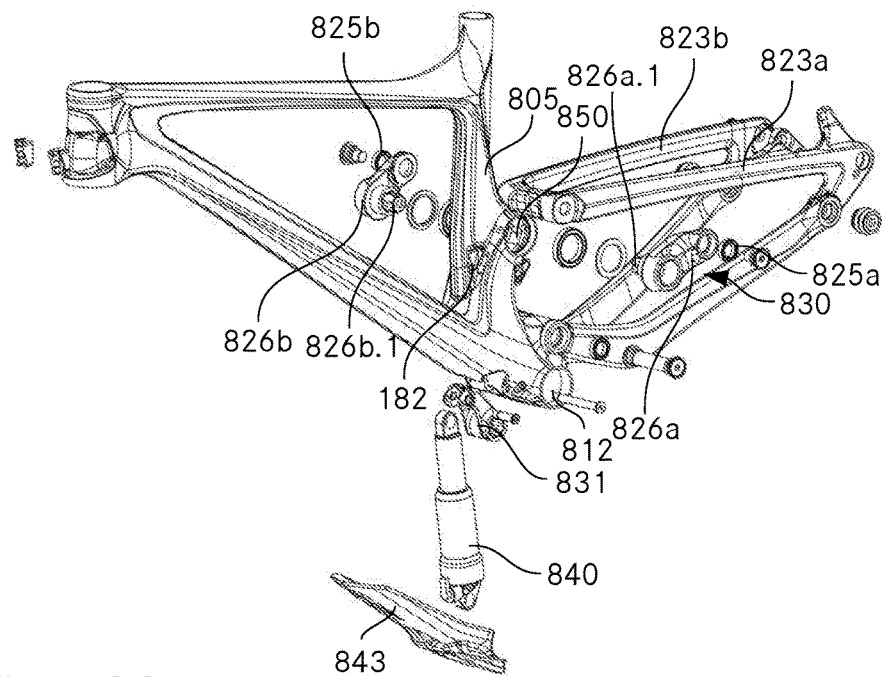
FIGS. 13A, B show a sixth variant of a transmission mechanism of the first embodiment.

Additionally or alternatively, further air inlet openings 183 are provided on the seat tube 105 (cf. also FIG. 13A). Said further air inlet openings are equipped with a covering cap with air inlet slots. Said covering cap conducts relative wind into the seat tube 105 and protects against the ingress of relatively large dirt particles. The covering cap is manufactured for example from a plastic or from a rubber-like material. The air inlet openings may be combined with a maintenance opening, for example for the installation and removal of the spring/damper element.

In the down tube, in a region adjoining the pedal-crank bearing 112, there is provided, as described above, an opening which is closed off by way of a cover 143. In the embodiment shown in FIG. 12, the opening also serves for the outflow of the cooling air out of the frame (cf. also FIG. 13A). For this purpose, the cover 143 has corresponding ducts 184a, 184b. Said ducts form passage openings between the inside of the frame and the outside. The ducts furthermore serve for the leadthrough of lines 188, 189 for the rear-wheel brake and for the gearshift. The ducts furthermore form an opening to the frame interior at the lowest-lying position. Therefore, water that has ingressed, and any dirt particles, are easily discharged again under the action of gravitational force.

The air flow that is generated in the frame serves primarily for the cooling of the spring/damper element that is accommodated in the frame.

Figure 13B:
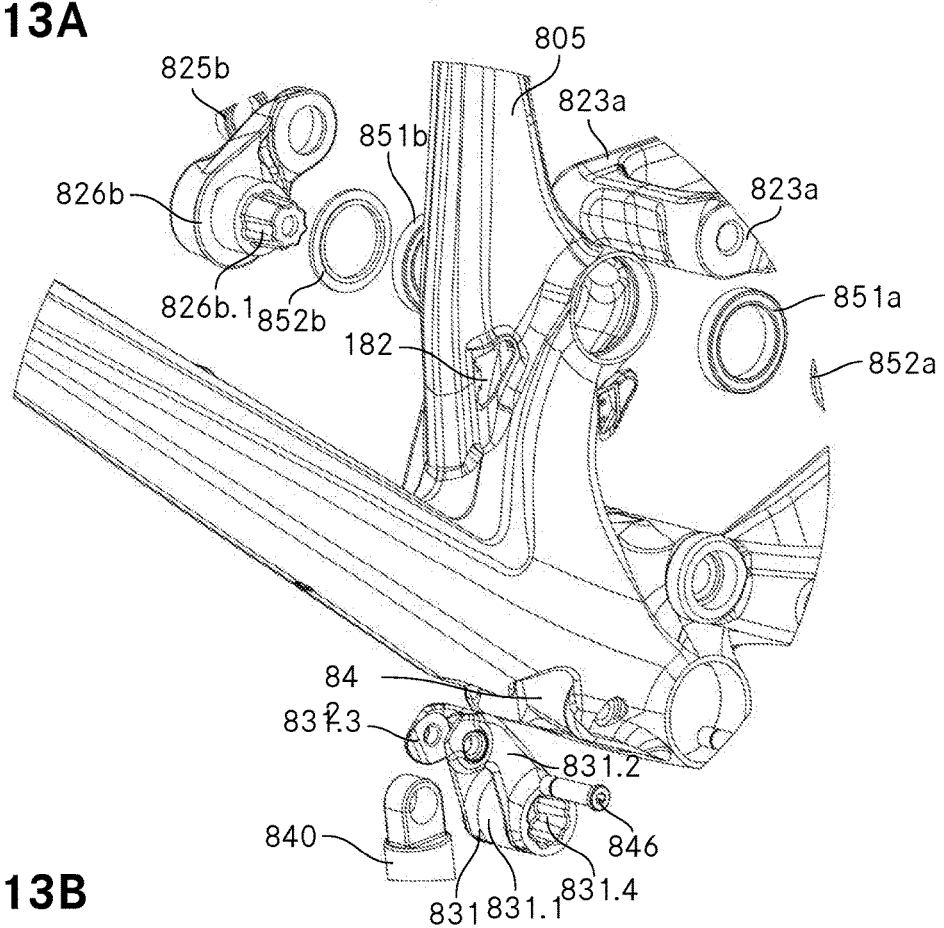

FIGS. 13A, B show a sixth variant of a transmission mechanism of the first embodiment. FIG. 13B is an enlarged illustration of the detail A of FIG. 13A. The transmission mechanism corresponds, in numerous aspects, to the mechanism as described above in conjunction with FIGS. 2 and 3.

The transmission mechanism 830 is accommodated in the seat tube 805, specifically in an axially oriented opening 850 on both sides. The transmission mechanism is coupled to two pivot levers 826a, 826b, which are connected rotationally conjointly to a transmission lever 831. The latter is, in the installed state, coupled rotatably to the free upper end of a spring/damper element 840. The spring/damper element 840 is accommodated in a lower region of the seat tube 805 and, in the installed state, is situated directly in front of the pedal-crank bearing 812. The lower end of the spring/damper element 840 is fastened by way of a bolt to the frame in the region of the pedal-crank bearing. The spring/damper element is accessible through an opening 842. Said opening is closed off by way of a cover 843.

The front limbs of the upper swing arms 823a, 823b are rotatably mounted on the pivot levers 826a, 826b by way of ball bearings 825a, 825b which define an axial rotary axis.

The individual components of the transmission mechanism 830 will be described in more detail below. The pivot levers 826a, 826b comprise, at their front end which in the installed state engages into the opening 850, axle pieces 826a.1, 826b.1 which are cylindrical in a first, outer region, and which then comprise a conically tapering second region which, on its outer shell, is provided with a profile 826b.2.

The transmission lever 831 likewise comprises a cylindrical axle piece 831.1 with an axial opening 831.4 extending all the way through. Said opening 831.4 has an internal profiling which is matched to the geometry of the profile 826b.2 of the two pivot levers 826a, 826b such that the pivot levers 826a, 826b can be fastened rotationally conjointly to the transmission lever 831 only in a predefined relative orientation with respect to said transmission lever.

The transmission lever 831 furthermore comprises a first section 831.2, which runs radially with respect to the rotary axis, and a section 831.3, which is angled relative to said first section by approximately 45°. Said angled section bears, on its free end, a fork with two eyelets which are aligned with one another.

The opening 850 in the frame tube 805 has pressed into it, at both sides, a ball bearing 851a, 851b. Suitable bearings are basically known, for example from the region of the pedal-crank bearings. The axle pieces 826a.1, 826b.1 of the two pivot levers 826a, 826b are now mounted, by way of their cylindrical sections, in the ball bearings 851a, 851b. Between the pivot levers 826a, 826b themselves and the face side of the ball bearings 851a, 851b, there are arranged bearing protection rings 852a, 852b.

The two pivot levers 826a, 826b are, by way of their shell-side toothings, mounted rotationally conjointly on the axle piece 831.1 of the transmission lever 831, and the connections are secured axially by way of a quick-action clamping means. In addition to the elements shown, spring washers may be positioned at suitable locations on the axle segments for tolerance compensation purposes.

The upper end of the spring/damper element 840 is fastened rotatably to the angled section 831.3 of the transmission lever 831. For this purpose, a securing bolt 846 is passed through the two eyelets of the angled section 831.3 and, between these, through a corresponding eyelet of the spring/damper element 840, and is subsequently secured by known means.

The invention is not restricted to the exemplary embodiments illustrated. It is possible for elements of different embodiments to be combined with one another. Furthermore, in particular, it is possible for details of the various elements, in particular the specific geometry and the type of fastening elements and mechanisms used, and the type of spring/damper element, to be designed differently. If a cover for the opening for the insertion of the spring/damper element is provided, said cover may have bulged portions in order to receive a valve of the spring/damper element or for the purposes of guiding lines. The cover can preferably be removed and re-fitted without the use of tools, for example by being attached to the frame, or to a holding part, by way of a clip mechanism. It is thus possible for the cover to be quickly and easily removed and attached. Furthermore, the cover may be designed such that its removal provides access to a receiving chamber (for example for a tool).

The transmission mechanism according to the invention makes it possible for brake and gearshift cables or further lines to be led through the transmission mechanism itself to the rear swing arm assembly. Further cables may be led through an opening between the cover and frame, or further within the frame. It is even conceivable for entire disk brake calipers to be threaded through the tube opening or even through the transmission mechanism. If a similar possibility exists in the region of the handlebar, the rear-wheel disk brakes can be installed as a whole on the bicycle without the need for assembly and corresponding deaeration.

The rotary axis of the transmission mechanism may basically be configured to be coaxial with the pedal-crank bearing, similarly to the situation already known for a swing arm bearing, cf. for example U.S. Pat. No. 8,430,417 B1 (Specialized).

The center of rotation of the swing arm assembly on the triangular frame need not imperatively be formed by a rotary bearing. It may also be realized by virtue of the swing arm, or a section of the swing arm, being produced from an elastic material (for example carbon).

In summary, it can be stated that the invention provides a two-wheeled vehicle with a rear-wheel suspension arrangement, in the case of which the risk of fouling of the spring/damper element is reduced.

The invention claimed is:

1. A two-wheeled vehicle having a rear-wheel suspension arrangement, comprising
   a) a frame with at least one frame tube;
   b) a swing arm assembly, which is mounted on the frame, for the suspension of a rear wheel;
   c) a linear spring/damper element;
   d) a transmission mechanism which is operatively connected at one side to the spring/damper element and at the other side to the swing arm assembly;
   wherein
   e) the spring/damper element is received in a receiving chamber within the frame tube; and
   f) the transmission mechanism comprises a rotary axis which runs through an axial opening in the frame tube, the axis having an axle element being mounted so as to be rotatable in a bearing that is formed by an axial opening in the frame tube, wherein the transmission mechanism is designed, and mounted on the frame, such that it transmits a force between the spring/damper element and swing arm assembly via the rotary axis; and wherein
   g) the spring/damper element is articulated on the axle element eccentrically with respect to the rotary axis.

2. The two-wheeled vehicle as claimed in claim 1, wherein an articulation point of the spring/damper element is positioned in a region, situated axially behind the axial opening in the frame tube, of the receiving chamber.

3. The two-wheeled vehicle as claimed in claim 1, wherein the swing arm assembly is articulated on the axle element eccentrically with respect to the rotary axis.

4. The two-wheeled vehicle as claimed in claim 3, wherein an articulation point of the swing arm assembly is positioned in a spatial region which encompasses an opening area of the opening and the regions situated axially behind and in front of said opening area.

5. The two-wheeled vehicle as claimed in claim 4, wherein the axle element is formed by a hollow cylindrical sleeve, wherein the articulation point of the spring/damper element is arranged in an inwardly directed recess of the sleeve.

6. The two-wheeled vehicle as claimed in claim 1, wherein an angle between an articulation point of the spring/damper element and an articulation point of the swing arm assembly is adjustable.

7. The two-wheeled vehicle as claimed in claim 6, comprising a control element, which can be actuated via a force transmission line, for the locking and unlocking and/or adjustment of the angle.

8. The two-wheeled vehicle as claimed in claim 1, characterized in that the bearing is in the form of a plain bearing.

9. The two-wheeled vehicle as claimed in claim 1, wherein the frame tube has, on both sides, in each case one axial opening, wherein the two openings are aligned with one another, and in that the axle element is of at least two-part construction and has an axial parting point.

10. The two-wheeled vehicle as claimed in claim 9, wherein the axle element comprises a quick-action clamping mechanism for the separation and fixing of the at least two parts of the axle element.

11. The two-wheeled vehicle as claimed in claim 1, wherein the at least one frame tube comprises a further opening, wherein the spring/damper element, in the state in which it is released from the transmission mechanism, can be removed from the frame tube through said further opening in a direction perpendicular to an axial direction.

12. The two-wheeled vehicle as claimed in claim 11, comprising a cover for closing off the further opening.

13. A two-wheeled vehicle having a rear-wheel suspension arrangement, comprising
   a) a frame with at least one frame tube;
   b) a swing arm assembly, which is mounted on the frame, for the suspension of a rear wheel;
   c) a linear spring/damper element;
   d) a transmission mechanism which is operatively connected at one side to the spring/damper element and at the other side to the swing arm assembly;
   wherein
   e) the spring/damper element is received in a receiving chamber within the frame tube;
   f) the transmission mechanism comprises a rotary axis which runs through an axial opening in the frame tube, the axis having an axle element being mounted so as to be rotatable in a bearing that is formed by an axial opening in the frame tube, wherein the transmission mechanism is designed, and mounted on the frame, such that it transmits a force between the spring/damper element and swing arm assembly via the rotary axis; and wherein
   g) the swing arm assembly is articulated on the axle element eccentrically with respect to the rotary axis.

14. A two-wheeled vehicle having a rear-wheel suspension arrangement, comprising
   a) a frame with at least one frame tube;
   b) a swing aim assembly, which is mounted on the frame, for the suspension of a rear wheel;
   c) a linear spring/damper element;
   d) a transmission mechanism which is operatively connected at one side to the spring/damper element and at the other side to the swing arm assembly;
   wherein
   e) the spring/damper element is received in a receiving chamber within the frame tube;
   f) the transmission mechanism comprises a rotary axis which runs through an axial opening in the frame tube, the axis having an axle element being mounted so as to be rotatable in a bearing that is formed by an axial opening in the frame tube, wherein the transmission mechanism is designed, and mounted on the frame, such that it transmits a force between the spring/damper element and swing arm assembly via the rotary axis; and wherein
   g) the frame tube has, on both sides, in each case one axial opening, wherein the two openings are aligned with one another, wherein the axle element is of at least two-part construction and has an axial parting point; and wherein
   h) the axle element comprises a quick-action clamping mechanism for the separation and fixing of the at least two parts of the axle element.

* * * * *